US012182873B2

(12) United States Patent
Mast et al.

(10) Patent No.: US 12,182,873 B2
(45) Date of Patent: Dec. 31, 2024

(54) SYSTEMS AND METHODS FOR AUTOMATING PROPERTY ASSESSMENT USING PROBABLE ROOF LOSS CONFIDENCE SCORES

(71) Applicant: STATE FARM MUTUAL AUTOMOBILE INSURANCE COMPANY, Bloomington, IL (US)

(72) Inventors: Joshua M. Mast, Bloomington, IL (US); Douglas L. Dewey, Bloomington, IL (US); Todd Binion, Bloomington, IL (US); Jeffrey Feid, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 17/356,764

(22) Filed: Jun. 24, 2021

(65) Prior Publication Data

US 2022/0414781 A1    Dec. 29, 2022

(51) Int. Cl.
*G06Q 40/00* (2023.01)
*G06N 7/01* (2023.01)
(Continued)

(52) U.S. Cl.
CPC ............. *G06Q 40/08* (2013.01); *G06N 7/01* (2023.01); *G06Q 30/0278* (2013.01); *G06Q 50/16* (2013.01)

(58) Field of Classification Search
CPC .............................. G06Q 40/08; G06N 7/005
(Continued)

(56) References Cited

U.S. PATENT DOCUMENTS 6,424,917 B1     7/2002   Kalkstein et al.
8,081,795 B2 *  12/2011   Brown .................. G06V 20/13
                                                                       382/141
(Continued)

FOREIGN PATENT DOCUMENTS

CN         111626536 A      9/2020
CN         113138558 A      7/2021
(Continued)

OTHER PUBLICATIONS

Deep analytics for workplace risk and disaster management; IBM Journal of Research and Development (vol. 64, Issue: 1/2, pp. 14:1-14:9); S. Dalal D. Bassu; Oct. 11, 2019. (Year: 2019).*

(Continued)

*Primary Examiner* — Tien C Nguyen
(74) *Attorney, Agent, or Firm* — MARSHALL, GERSTEIN & BORUN LLP

(57) ABSTRACT

Systems and methods are provided for automating property assessment using probable roof loss confidence scores. More particularly, the systems and methods may generate a baseline probable roof loss confidence score based upon buildings, roof, weather, hail, and climate data. The systems and methods may predict a specific event and a set of characteristics of the specific event. The systems and methods may predict a level of roof damage and a cost of roof damage based upon the predicted level of roof damage. The systems and methods may adjust a risk-related factor, and may further adjust policy parameters based upon the risk-related factor. A probable roof loss confidence score may be generated, as well as property insurance claims data or property insurance loss mitigation data based upon probable roof loss confidence score data.

20 Claims, 22 Drawing Sheets

(51) Int. Cl.
*G06Q 40/08* (2012.01)
*G06Q 30/02* (2023.01)
*G06Q 50/16* (2012.01)

(58) Field of Classification Search
USPC ........ 705/35, 4, 37, 38, 39, 40, 71; 709/224, 709/225; 719/313; 702/3; 382/141; 370/252; 726/7; 715/764
See application file for complete search history.

(56) References Cited

U.S. PATENT DOCUMENTS

| | | | |
|---|---|---|---|
| 8,280,633 B1 * | 10/2012 | Eldering | G06Q 40/08 702/3 |
| 8,490,006 B1 | 7/2013 | Reeser et al. | |
| 8,527,306 B1 | 9/2013 | Reeser et al. | |
| 8,533,144 B1 | 9/2013 | Reeser et al. | |
| 8,640,038 B1 | 1/2014 | Reeser et al. | |
| 8,665,084 B2 | 3/2014 | Shapiro et al. | |
| 8,890,680 B2 | 11/2014 | Reeser et al. | |
| 8,917,186 B1 | 12/2014 | Grant | |
| 8,976,937 B2 | 3/2015 | Shapiro et al. | |
| 9,049,168 B2 | 6/2015 | Jacob et al. | |
| 9,057,746 B1 | 6/2015 | Houlette et al. | |
| 9,117,349 B2 | 8/2015 | Shapiro et al. | |
| 9,142,119 B1 | 9/2015 | Grant | |
| 9,152,737 B1 | 10/2015 | Micali et al. | |
| 9,183,578 B1 | 11/2015 | Reeser et al. | |
| 9,202,363 B1 | 12/2015 | Grant | |
| 9,262,909 B1 | 2/2016 | Grant | |
| 9,286,772 B2 | 3/2016 | Shapiro et al. | |
| 9,344,330 B2 | 5/2016 | Jacob et al. | |
| 9,424,737 B2 | 8/2016 | Bailey et al. | |
| 9,443,195 B2 | 9/2016 | Micali et al. | |
| 9,472,092 B1 | 10/2016 | Grant | |
| 9,536,148 B2 | 1/2017 | Gross | |
| 9,589,441 B2 | 3/2017 | Shapiro et al. | |
| 9,609,003 B1 | 3/2017 | Chmielewski et al. | |
| 9,665,892 B1 | 5/2017 | Reeser et al. | |
| 9,666,060 B2 | 5/2017 | Reeser et al. | |
| 9,699,529 B1 | 7/2017 | Petri et al. | |
| 9,739,813 B2 | 8/2017 | Houlette et al. | |
| 9,786,158 B2 | 10/2017 | Beaver et al. | |
| 9,798,979 B2 | 10/2017 | Fadell et al. | |
| 9,798,993 B2 | 10/2017 | Payne et al. | |
| 9,800,570 B1 | 10/2017 | Bleisch | |
| 9,800,958 B1 | 10/2017 | Petri et al. | |
| 9,812,001 B1 | 11/2017 | Grant | |
| 9,888,371 B1 | 2/2018 | Jacob | |
| 9,892,463 B1 | 2/2018 | Hakimi-Boushehri et al. | |
| 9,898,168 B2 | 2/2018 | Shapiro et al. | |
| 9,898,912 B1 | 2/2018 | Jordan, II et al. | |
| 9,911,042 B1 | 3/2018 | Cardona et al. | |
| 9,923,971 B2 | 3/2018 | Madey et al. | |
| 9,942,630 B1 | 4/2018 | Petri et al. | |
| 9,947,202 B1 | 4/2018 | Moon et al. | |
| 9,948,477 B2 | 4/2018 | Marten | |
| 9,978,033 B1 | 5/2018 | Payne et al. | |
| 9,997,056 B2 | 6/2018 | Bleisch | |
| 10,002,295 B1 | 6/2018 | Cardona et al. | |
| 10,042,341 B1 | 8/2018 | Jacob | |
| 10,047,974 B1 | 8/2018 | Riblet et al. | |
| 10,055,793 B1 | 8/2018 | Call et al. | |
| 10,055,803 B2 | 8/2018 | Orduna et al. | |
| 10,057,664 B1 | 8/2018 | Moon et al. | |
| 10,073,929 B2 | 9/2018 | Vaynriber et al. | |
| 10,102,584 B1 | 10/2018 | Devereaux et al. | |
| 10,102,585 B1 | 10/2018 | Bryant et al. | |
| 10,107,708 B1 | 10/2018 | Schick et al. | |
| 10,134,092 B1 | 11/2018 | Harvey et al. | |
| 10,142,394 B2 | 11/2018 | Chmielewski et al. | |
| 10,176,705 B1 | 1/2019 | Grant | |
| 10,181,079 B2 | 1/2019 | Labrie et al. | |
| 10,181,160 B1 | 1/2019 | Hakimi-Boushehri et al. | |
| 10,186,134 B1 | 1/2019 | Moon et al. | |
| 10,198,771 B1 | 2/2019 | Madigan et al. | |
| 10,217,068 B1 | 2/2019 | Davis et al. | |
| 10,229,394 B1 | 3/2019 | Davis et al. | |
| 10,235,716 B2 | 3/2019 | Boutin | |
| 10,244,294 B1 | 3/2019 | Moon et al. | |
| 10,249,158 B1 | 4/2019 | Jordan, II et al. | |
| 10,268,691 B1 | 4/2019 | Emison et al. | |
| 10,282,787 B1 | 5/2019 | Hakimi-Boushehri et al. | |
| 10,282,788 B1 | 5/2019 | Jordan, II et al. | |
| 10,282,961 B1 | 5/2019 | Jordan, II et al. | |
| 10,295,431 B1 | 5/2019 | Schick et al. | |
| 10,296,978 B1 | 5/2019 | Corder et al. | |
| 10,297,138 B2 | 5/2019 | Reeser et al. | |
| 10,304,313 B1 | 5/2019 | Moon et al. | |
| 10,311,302 B2 | 6/2019 | Kottenstette et al. | |
| 10,323,860 B1 | 6/2019 | Riblet et al. | |
| 10,325,473 B1 | 6/2019 | Moon et al. | |
| 10,332,059 B2 | 6/2019 | Matsuoka et al. | |
| 10,346,811 B1 | 7/2019 | Jordan, II et al. | |
| 10,353,359 B1 | 7/2019 | Jordan, II et al. | |
| 10,354,386 B1 | 7/2019 | Farnsworth et al. | |
| 10,356,303 B1 | 7/2019 | Jordan, II et al. | |
| 10,366,288 B1 | 7/2019 | Kottenstette et al. | |
| 10,373,256 B1 | 8/2019 | Allen et al. | |
| 10,387,966 B1 | 8/2019 | Shah et al. | |
| 10,388,135 B1 | 8/2019 | Jordan, II et al. | |
| 10,412,169 B1 | 9/2019 | Madey et al. | |
| 10,430,890 B1 | 10/2019 | Corder et al. | |
| 10,446,000 B2 | 10/2019 | Friar et al. | |
| 10,467,476 B1 | 11/2019 | Cardona et al. | |
| 10,469,282 B1 | 11/2019 | Konrardy et al. | |
| 10,480,825 B1 | 11/2019 | Riblet et al. | |
| 10,482,746 B1 | 11/2019 | Moon et al. | |
| 10,506,411 B1 | 12/2019 | Jacob | |
| 10,514,669 B1 | 12/2019 | Call et al. | |
| 10,515,372 B1 | 12/2019 | Jordan, II et al. | |
| 10,522,009 B1 | 12/2019 | Jordan, II et al. | |
| 10,546,478 B1 | 1/2020 | Moon et al. | |
| 10,547,918 B1 | 1/2020 | Moon et al. | |
| 10,565,541 B2 | 2/2020 | Payne et al. | |
| 10,573,146 B1 | 2/2020 | Jordan, II et al. | |
| 10,573,149 B1 | 2/2020 | Jordan, II et al. | |
| 10,579,028 B1 | 3/2020 | Jacob | |
| 10,586,177 B1 | 3/2020 | Choueiter et al. | |
| 10,607,295 B1 | 3/2020 | Hakimi-Boushehri et al. | |
| 10,634,576 B1 | 4/2020 | Schick et al. | |
| 10,643,072 B2 | 5/2020 | Kottenstette et al. | |
| 10,664,922 B1 | 5/2020 | Madigan et al. | |
| 10,679,292 B1 | 6/2020 | Call et al. | |
| 10,685,402 B1 | 6/2020 | Bryant et al. | |
| 10,699,346 B1 | 6/2020 | Corder et al. | |
| 10,699,348 B1 | 6/2020 | Devereaux et al. | |
| 10,726,494 B1 | 7/2020 | Shah et al. | |
| 10,726,500 B1 | 7/2020 | Shah et al. | |
| 10,726,558 B2 | 7/2020 | Ruda et al. | |
| 10,733,671 B1 | 8/2020 | Hakimi-Boushehri et al. | |
| 10,733,868 B2 | 8/2020 | Moon et al. | |
| 10,735,829 B2 | 8/2020 | Petri et al. | |
| 10,740,691 B2 | 8/2020 | Choueiter et al. | |
| 10,741,033 B1 | 8/2020 | Jordan et al. | |
| 10,750,252 B2 | 8/2020 | Petri et al. | |
| 10,776,883 B2 | 9/2020 | Labrie et al. | |
| 10,795,329 B1 | 10/2020 | Jordan, II et al. | |
| 10,796,149 B2 | 10/2020 | Labrie et al. | |
| 10,796,557 B2 | 10/2020 | Sundermeyer et al. | |
| 10,802,477 B1 | 10/2020 | Konrardy et al. | |
| 10,804,700 B2 | 10/2020 | Cohen et al. | |
| 10,818,105 B1 | 10/2020 | Konrardy et al. | |
| 10,823,458 B1 | 11/2020 | Riblet et al. | |
| 10,824,971 B1 | 11/2020 | Davis et al. | |
| 10,825,320 B1 | 11/2020 | Moon et al. | |
| 10,825,321 B2 | 11/2020 | Moon et al. | |
| 10,832,225 B1 | 11/2020 | Davis et al. | |
| 10,846,800 B1 | 11/2020 | Bryant et al. | |
| 10,885,587 B1 | 1/2021 | Mendoza et al. | |
| 10,907,844 B2 | 2/2021 | Ribbich et al. | |
| 10,922,756 B1 | 2/2021 | Call et al. | |
| 10,922,948 B1 | 2/2021 | Moon et al. | |
| 10,943,447 B1 | 3/2021 | Jordan, II et al. | |

(56) References Cited

U.S. PATENT DOCUMENTS

| | | |
|---|---|---|
| 10,970,990 B1 | 4/2021 | Jacob |
| 10,990,069 B1 | 4/2021 | Jacob |
| 11,003,334 B1 | 5/2021 | Conway et al. |
| 11,004,320 B1 | 5/2021 | Jordan, II et al. |
| 11,015,997 B1 | 5/2021 | Schick et al. |
| 11,017,480 B2 | 5/2021 | Shah et al. |
| 11,042,137 B1 | 6/2021 | Call et al. |
| 11,042,942 B1 | 6/2021 | Hakimi-Boushehri et al. |
| 11,043,098 B1 | 6/2021 | Jordan, II et al. |
| 11,049,078 B1 | 6/2021 | Jordan, II et al. |
| 11,049,189 B2 | 6/2021 | Shah et al. |
| 11,055,786 B2 | 7/2021 | Shreve et al. |
| 11,074,659 B1 | 7/2021 | Hakimi-Boushehri et al. |
| 11,100,594 B1 | 8/2021 | West et al. |
| 11,118,812 B1 | 9/2021 | Riblet et al. |
| 11,126,708 B2 | 9/2021 | Reimer |
| 11,131,597 B1 * | 9/2021 | Oakes, III ............... G06T 17/00 |
| 11,151,378 B2 | 10/2021 | Kottenstette et al. |
| 11,164,257 B1 | 11/2021 | Devereaux et al. |
| 11,210,552 B2 | 12/2021 | Kossyk et al. |
| 11,222,426 B2 | 1/2022 | Richter et al. |
| 11,232,150 B2 | 1/2022 | Vianello et al. |
| 11,232,873 B1 | 1/2022 | Aspro et al. |
| 11,277,465 B2 | 3/2022 | Chmielewski et al. |
| 11,348,193 B1 | 5/2022 | Konrardy et al. |
| 11,361,544 B2 | 6/2022 | Splittstoesser |
| 11,367,265 B2 | 6/2022 | Vianello et al. |
| 11,417,212 B1 | 8/2022 | Farooqui et al. |
| 11,593,887 B1 * | 2/2023 | Gaudin ............. G06Q 30/0645 |
| 11,709,253 B1 | 7/2023 | Maestas |
| 2009/0216552 A1 | 8/2009 | Watrous |
| 2009/0265193 A1 | 10/2009 | Collins et al. |
| 2014/0245165 A1 | 8/2014 | Battcher et al. |
| 2014/0245204 A1 | 8/2014 | Battcher et al. |
| 2014/0266669 A1 | 9/2014 | Fadell et al. |
| 2015/0061859 A1 | 3/2015 | Matsuoka et al. |
| 2015/0073864 A1 | 3/2015 | Labrie et al. |
| 2015/0082883 A1 | 3/2015 | Moffatt |
| 2015/0170288 A1 | 6/2015 | Harton et al. |
| 2015/0302529 A1 | 10/2015 | Jagannathan |
| 2015/0347910 A1 | 12/2015 | Fadell et al. |
| 2015/0348204 A1 | 12/2015 | Daues |
| 2016/0048923 A1 | 2/2016 | Maher et al. |
| 2016/0189531 A1 | 6/2016 | Modi et al. |
| 2016/0265993 A1 | 9/2016 | Sutter et al. |
| 2016/0334545 A1 | 11/2016 | Varelas et al. |
| 2017/0039307 A1 * | 2/2017 | Koger .................... G06F 30/23 |
| 2017/0249510 A1 | 8/2017 | Labrie et al. |
| 2017/0270612 A1 | 9/2017 | Howe et al. |
| 2017/0330282 A1 | 11/2017 | Pratt et al. |
| 2017/0352099 A1 | 12/2017 | Howe et al. |
| 2018/0071949 A1 | 3/2018 | Giles |
| 2018/0336418 A1 | 11/2018 | Splittstoesser |
| 2019/0114717 A1 | 4/2019 | Labrie et al. |
| 2019/0147244 A1 | 5/2019 | Labrie et al. |
| 2019/0251520 A1 | 8/2019 | Bentley, III et al. |
| 2019/0304026 A1 | 10/2019 | Lyman et al. |
| 2020/0066257 A1 | 2/2020 | Smith et al. |
| 2020/0134573 A1 * | 4/2020 | Vickers .................. G06F 16/29 |
| 2020/0134728 A1 | 4/2020 | Vickers |
| 2020/0134753 A1 | 4/2020 | Vickers |
| 2020/0302549 A1 | 9/2020 | Jordan, II et al. |
| 2020/0327791 A1 | 10/2020 | Moon et al. |
| 2021/0035432 A1 | 2/2021 | Moon et al. |
| 2021/0042843 A1 | 2/2021 | Bryant et al. |
| 2021/0089811 A1 | 3/2021 | Strong |
| 2021/0133891 A1 * | 5/2021 | Jagannathan .......... G06Q 40/08 |
| 2021/0158671 A1 | 5/2021 | Jordan, II et al. |
| 2021/0279811 A1 | 9/2021 | Waltman et al. |
| 2021/0312789 A1 | 10/2021 | Linn |
| 2022/0101275 A1 | 3/2022 | Aspro et al. |

FOREIGN PATENT DOCUMENTS

| | | |
|---|---|---|
| JP | 2003157357 A | 5/2003 |
| KR | 20150129845 A | 11/2015 |
| WO | WO-2014159131 A2 | 10/2014 |
| WO | WO-2016081511 A2 | 5/2016 |
| WO | WO-2021087185 A1 | 5/2021 |
| WO | WO-2021/248030 A1 | 12/2021 |
| WO | WO-2022/165303 A1 | 8/2022 |

OTHER PUBLICATIONS

Measuring and modeling the effect of snow on photovoltaic system performance; 2010 35th IEEE Photovoltaic Specialists Conference (pp. 000973-000978); Powers, L. Newmiller, J., Townsend, T., Jun. 20, 2010. (Year: 2010).*

Aufranc, Haven Open Source App Transforms Your Old Android Smartphone into a Smart Security Camera, CNX Software—Embedded Systems News, Dec. 23, 2017.

Chen, Smart Home, Investopedia, updated Feb. 25, 2020.

Dube, How to Build a Security Camera Nework Out of Old Smartphones, downloaded from the Internet at: <https://www.makeusof.com/tag/how-to-build-a-security-camera-network-out-of-old-smartphones> Jul. 12, 2017.

Hail Monitoring System, HailSens Monitoring (Oct. 2020).

Upgrading your roof? Consider these hurricane-resistant tips, Renew Financial, Oct. 7, 2016.

* cited by examiner

SYSTEMS AND METHODS FOR AUTOMATING PROPERTY ASSESSMENT USING PROBABLE ROOF LOSS CONFIDENCE SCORES

TECHNICAL FIELD

The present disclosure is directed to apparatuses, systems and methods for automating property assessment. More particularly, the present disclosure is directed to systems and methods for automating property assessment using probable roof loss confidence scores.

BACKGROUND

Storm damage (e.g., wind damage, hail damage, rain damage, etc.) to an exterior of a building (e.g., a roof of a building, siding on a building, exterior windows of a building, etc.). A roof of a building, for example, may represent a line of defense against additional property damage from high winds, rain, and hail.

Accordingly, identifying damaged buildings as soon as possible after a storm and repairing the damage (at least temporarily) is desirable. For example, a hail storm may damage a roof of a building to an extent that water may leak through the roof causing additional damage to the roof and/or other portions of the building.

Large-scale storms may impact a geographic area that may include thousands of buildings. Insurance companies, for example, may receive hundreds of thousands of insurance claims each year associated with storm damage. While an insurance company may be motivated to repair initial storm damage soon after an associated storm, the insurance company must also avoid payment of improper claims. Often times, for example, an insurance company will dispatch an insurance adjustor to a property site in order to assess storm damage claims.

An insurance company may wish to expedite the claim process, both to improve customer experience and to prevent further damage resulting from delayed repairs. Moreover, an insurance company may or may not be obligated to pay a claim based upon the collected data and the applicable insurance contract. Moreover, an insurance company may be obligated to pay a claim based upon an associated insurance contract. Therefore, decisions on payment of claims based upon collected data should be made as quickly and accurately as possible.

Apparatuses, systems and methods are needed to expedite property damage insurance claims that are associated with storm damage, as well as to improve prediction accuracy for the occurrence and extent of damage. Additionally, improvements in predicting or determining repairs and costs associated with damage are needed.

SUMMARY

Systems, computer-implemented methods, and computer-readable medium storing computer-readable instructions for automating property assessment for a building at least partially based upon a probable roof loss confidence score associated with a roof of the building are disclosed hereon. Such systems, methods, and instructions may include implementing, by one or more processors of a computing device, the following: a building data receiving module to obtain building data representative of attributes of the building; a roof data receiving module to obtain roof data associated with the building based upon the building data; a weather data receiving module to obtain historical weather data associated with the building based upon the building data; a hail data receiving module to obtain historical hail data associated with the building based upon the building data; a climate region data receiving module to obtain climate region data associated with the building based upon the building data; a base-line probable roof loss confidence score data generation module to generate base-line probable roof loss confidence score data based upon the building data, the roof data, the historical weather data, the historical hail data, and the climate region data; a current roof condition determining module to determine a current roof condition based upon at least one of the building or roof data; and/or a level of roof damage predicting module to determine the predicted level of roof damage to the roof of the building based upon the base-line probable roof loss confidence score and the current roof condition.

The system implementing such methods or instructions may also include a building insurance underwriting data generation module stored on the memory of the confidence score computing device that, when executed by the processor of the confidence score computing device, may cause the processor of the confidence score computing device to generate building insurance underwriting data based upon the base-line probable roof loss confidence score data. The system may also include a specific event predicting module stored on the memory of the confidence score computing device that, when executed by the processor of the confidence score computing device, may cause the processor of the confidence score computing device to predict a specific event and a set of characteristics of the specific event based upon the building data, the weather data, the hail data, and the climate data. The system may also include a level of roof damage predicting module stored on the memory of the confidence score computing device that, when executed by the processor of the confidence score computing device, may cause the processor of the confidence score computing device to predict a level of roof damage to the roof of the building based upon the building data, the roof data, the weather data, the hail data, the climate zone data, and the base-line probable roof loss confidence score. The system may also include a remaining lifespan predicting module stored on the memory of the confidence score computing device that, when executed by the processor of the confidence score computing device, may cause the processor of the confidence score computing device to predict remaining roof or building lifespan based upon the building data, the roof data, and the climate zone data. The system may also include a policy parameter adjusting module stored on the memory of the confidence score computing device that, when executed by the processor of the confidence score computing device, may cause the processor of the confidence score computing device to adjust policy parameters based upon the base-line probable roof loss confidence score, the predicted level of roof damage, predicted cost of roof damage, or a risk-related factor. The policy parameters may also be adjusted based upon the building data, the roof data, the weather data, the hail data, and the climate zone data.

BRIEF DESCRIPTION OF THE FIGURES

The Figures described below depict various aspects of computer-implemented methods, systems comprising computer-readable media, and electronic devices disclosed therein. It should be understood that each Figure depicts an embodiment of a particular aspect of the disclosed methods, systems, media, and devices, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

Figure 1A:
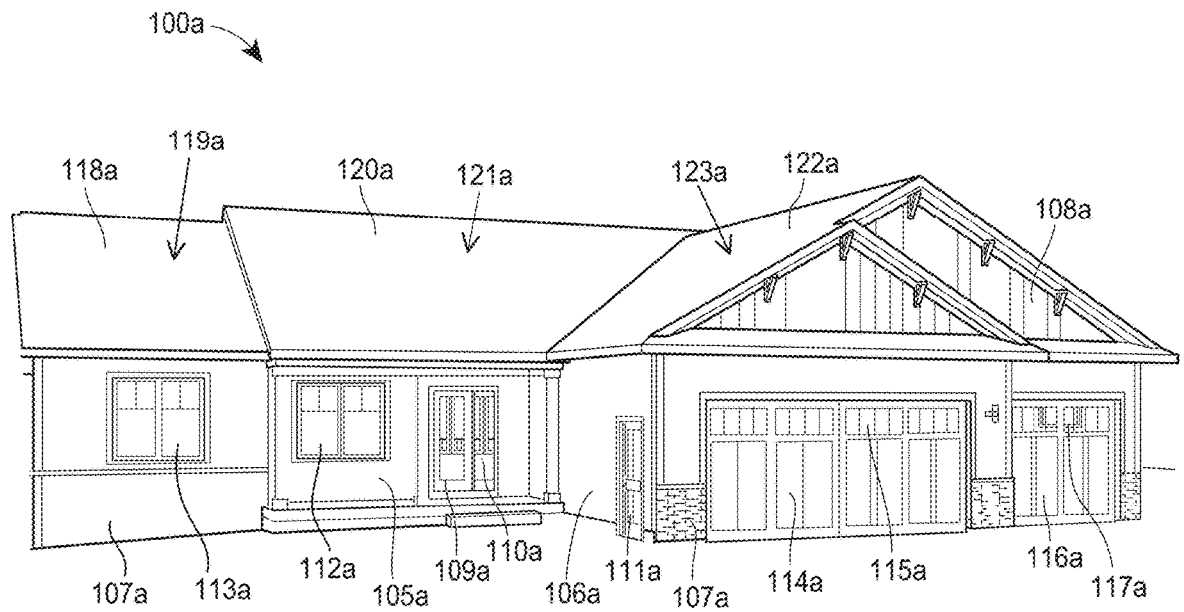
FIGS. 1A-G depict various views of an example building site.
Figure 1B:
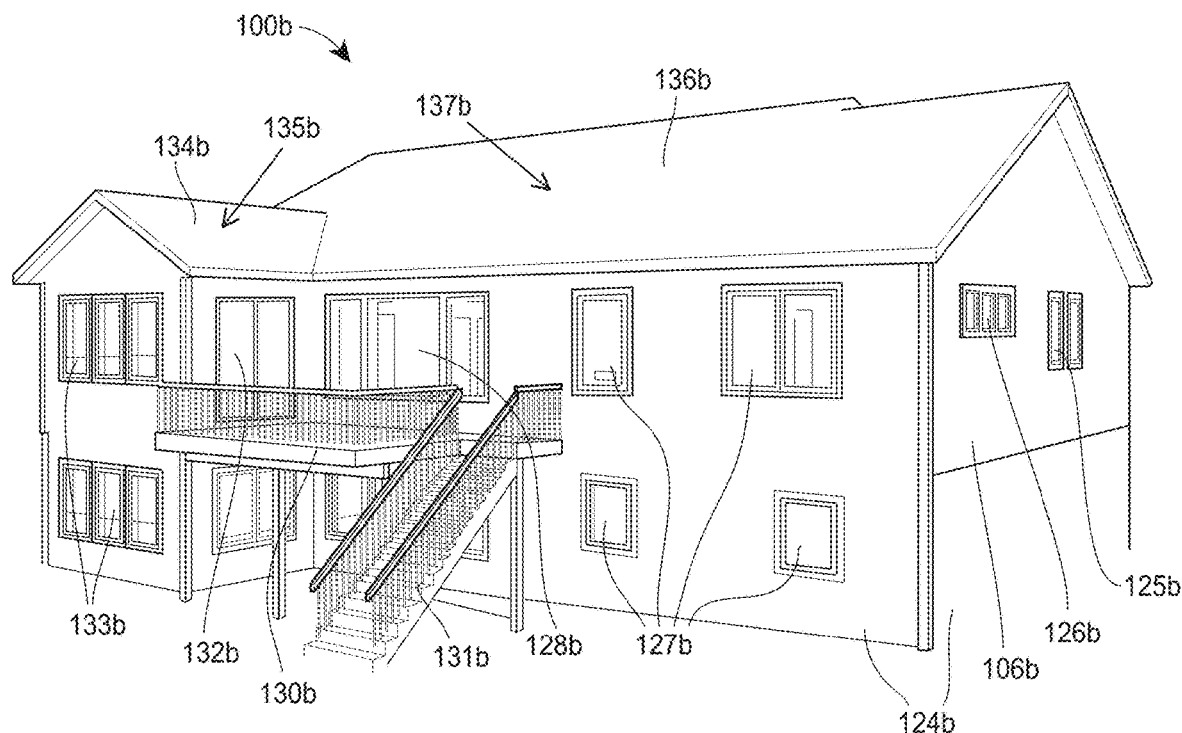
Figure 1C:
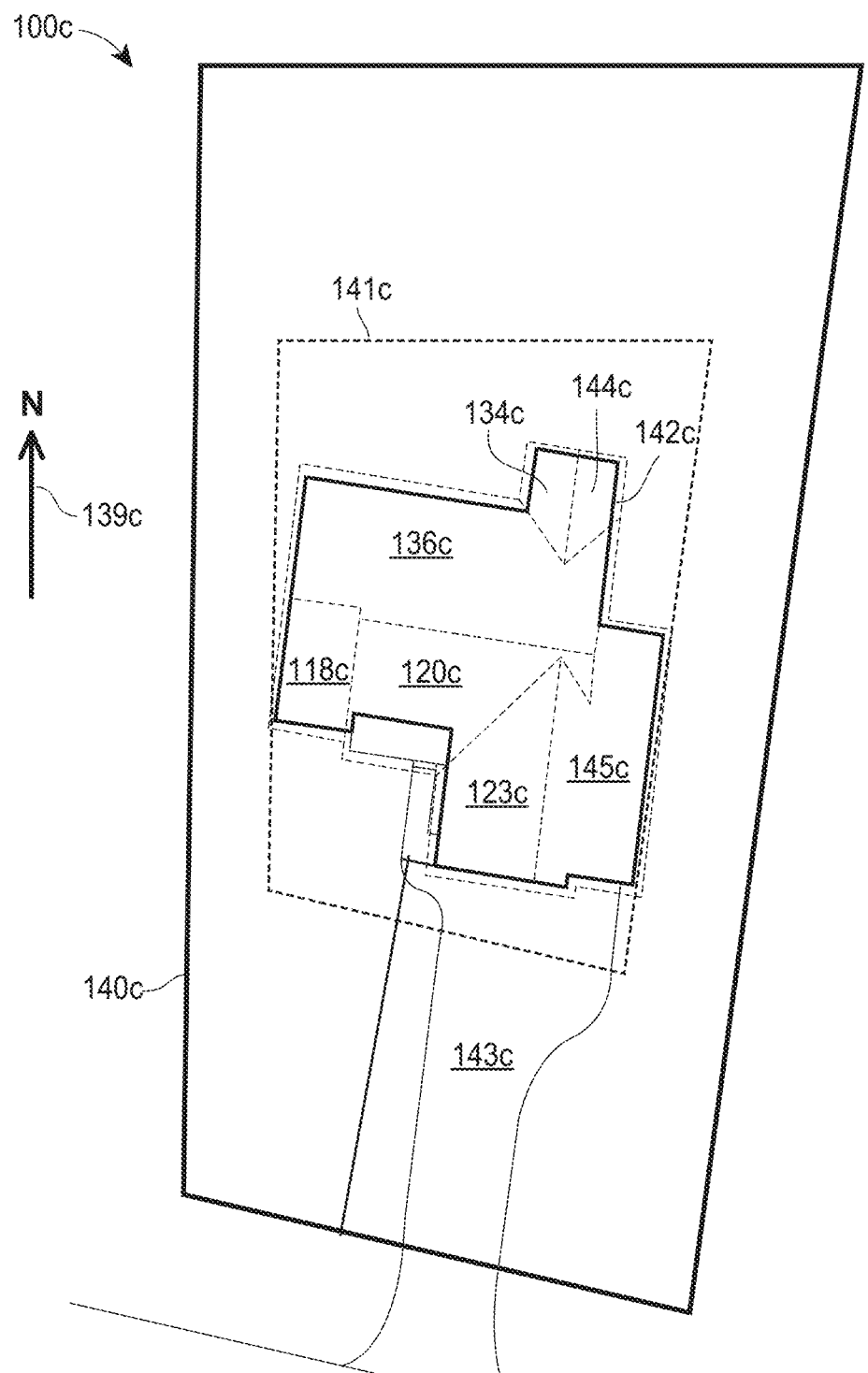
Figure 1D:
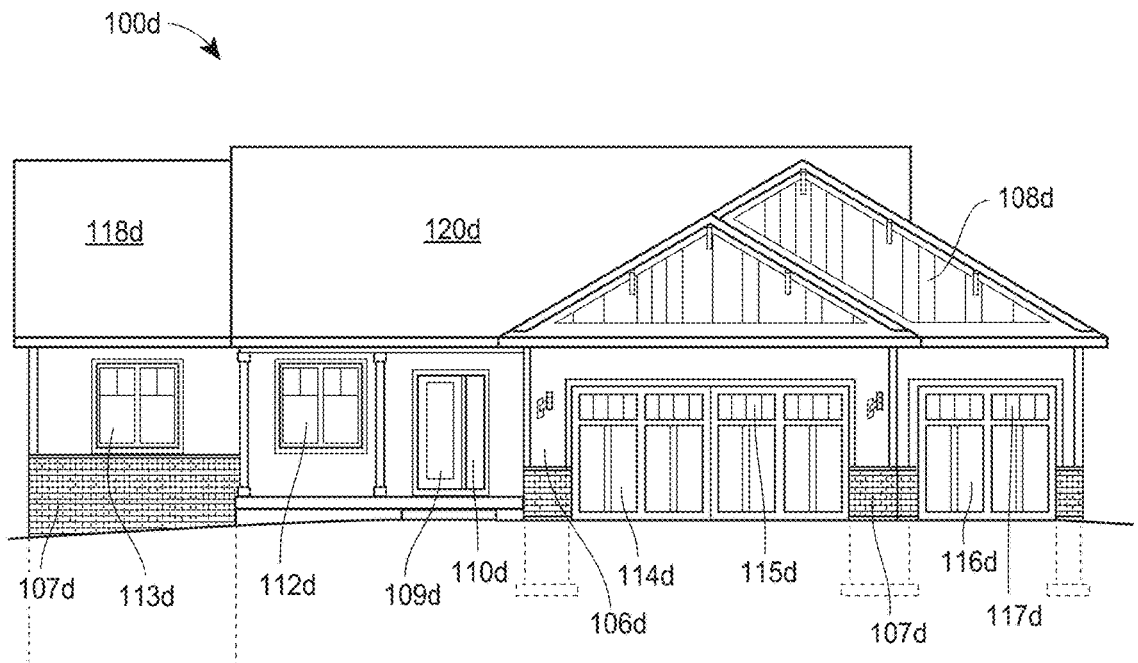
Figure 1E:
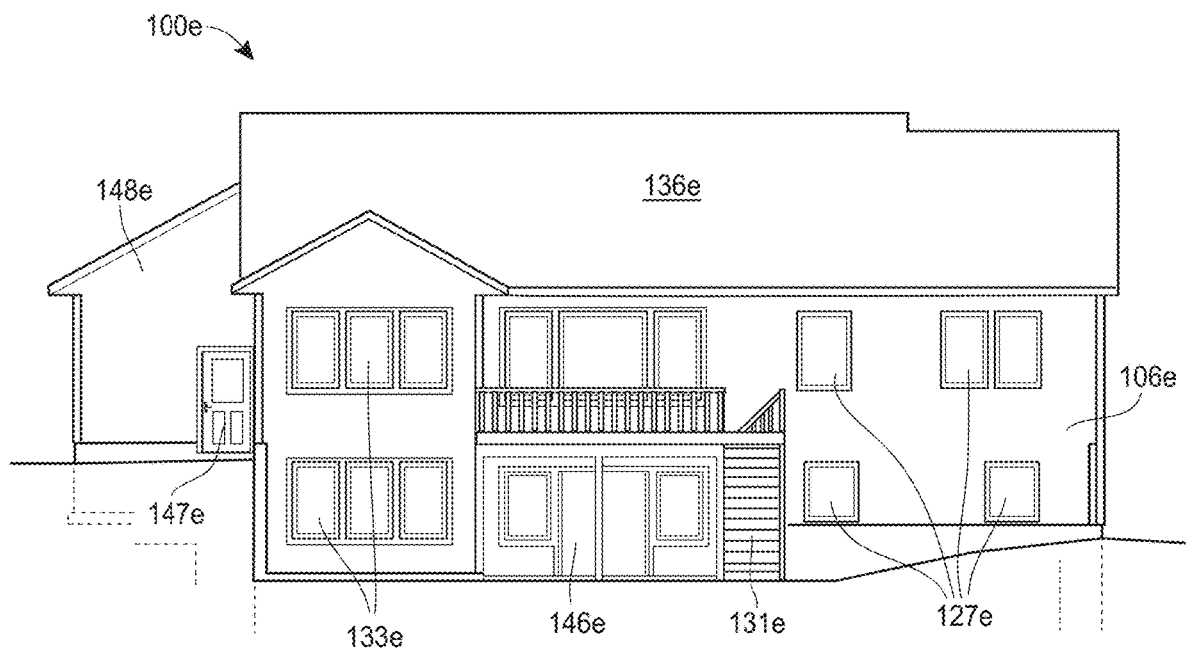
Figure 1F:
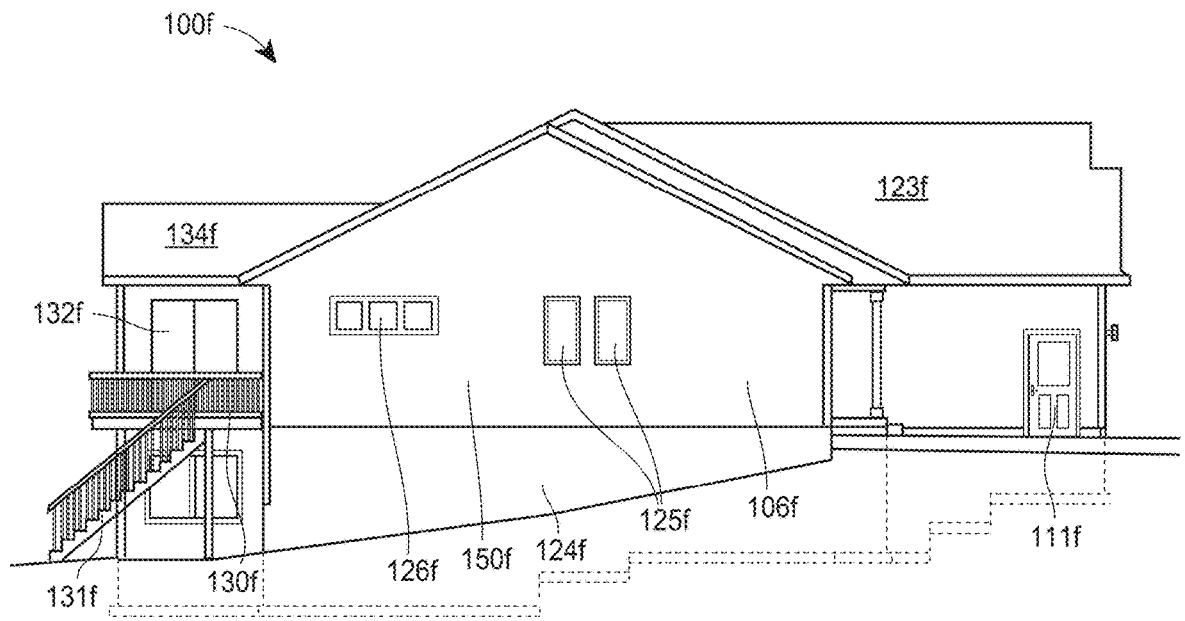
Figure 1G:
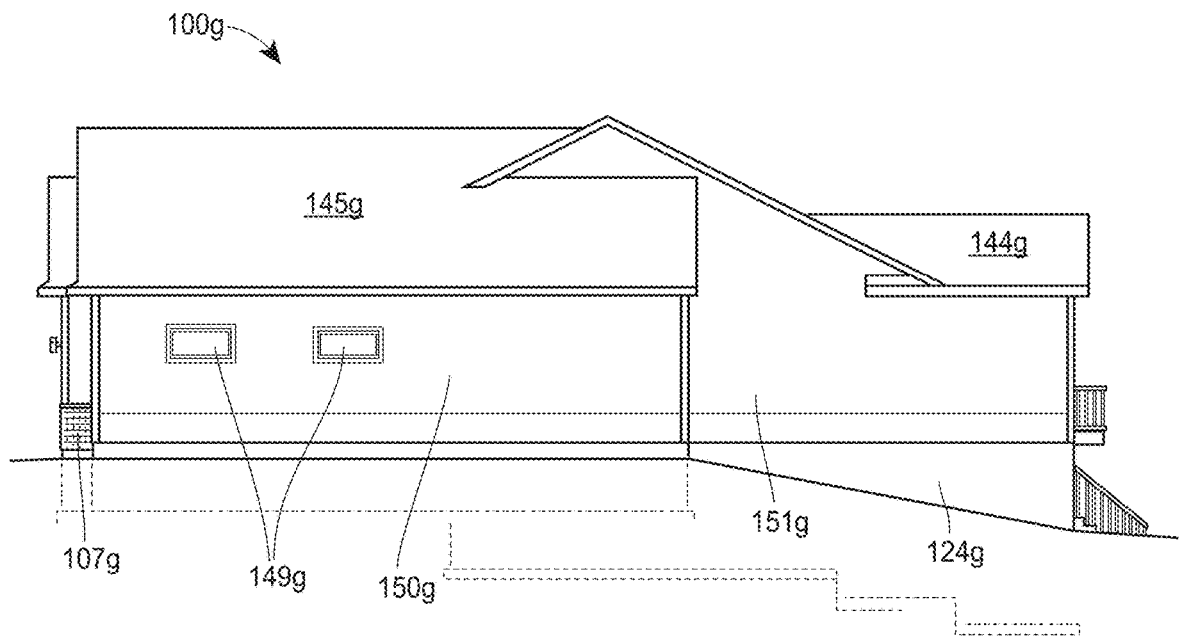

The Figures depict aspects of the present invention for purposes of illustration only. One skilled in the art will readily recognize from the following discussion that alternate aspects of the structures and methods illustrated herein may be employed without departing from the principles of the invention described herein.

DETAIL DESCRIPTION

As noted above, roof damage resulting from weather events such as strong storms and hail is a significant problem. While generalized estimates of susceptibility to damage have been used in insurance underwriting processes, such estimates lack sufficient accuracy for some purposes (e.g., determining an extent of damage to a roof of a particular building from a particular weather event). Additionally, existing processes of estimating likelihoods of damage are unable to accurately determine roof damage for a structure (either generally or based upon a specific weather event) without requiring an inspection of the roof to identify indicia of damage. Accurately determining roof damage without inspecting the roof is particularly useful in situations where large areas are affected by severe weather events, such that a large number of buildings may need to be assessed to determine whether they have suffered roof damage. To improve the accuracy and efficiency of determining roof damage, the techniques disclosed herein obtain and analyze data relating to area-specific and building-specific conditions to generate a building-specific predicted level of roof damage. Unlike general risk level estimates, such building-specific predicted level of roof damage provides actionable information regarding a specific building, such as whether a roof of the building should be repaired or replaced. The actionable information also streamlines the process of performing necessary repairs or replacements to a roof as compared to generalized estimates. When using generalized estimates, a first entity (e.g., roof repair team, roof replacement team, roof damage appraiser, etc.) may make an unnecessary trip to the building. If the first entity is not capable of performing the necessary repairs, or in the case where the damage is too costly to repair and the roof must be replaced, a second entity must likewise travel to the building before repairs can begin. Additional costs are incurred when the first entity and the second entity must both travel to the building to repair or replace the roof. By determining the extent of damage to the roof shortly after the damage is caused, the time and costs involved to currently process an insurance claim may be reduced.

A system (e.g., a computing system 300 of FIG. 3) may be implemented to automate property assessment according to the techniques described herein. For example, an insurance company may wish to determine risk of insuring a roof and/or a building or an appropriate insurance premium for insuring the roof and/or the building. The automated property assessment may occur prior to a customer purchasing the building. The automated property assessment may occur prior to or during the process of the insurance company deciding to insure the building. As described in detail herein, the system 300 may generate a base-line probable roof loss confidence score for a roof of the building based upon building data (e.g., a geographic location of a building, a date on which a building was built, etc.), roof data (e.g., a type of roofing material, an impact resistance rating of a roofing material, a date on which a roof was installed, etc.), historical weather data (e.g., historical wind speeds associated with historical storms in a geographic area associated with the building, historical wind directions associated with historical storms in a geographic area associated with the building, historical lengths of time of historical storms that impacted a geographic area associated with the building, etc.), and/or historical hail data (e.g., sizes of hail that have historically impacted a geographic area associated with the building, hardness of hail that have historically impacted a geographic area associated with the building, lengths of time hail historically impacted a geographic area associated with the building, a three-dimensional shape of the hail that has historically impacted a geographic area associated with the building, etc.). The base-line probable roof loss confidence score for the roof of the building may be used in performing an automated property assessment.

In another example, the insurance company may implement the system 300 to respond to and/or anticipate property damage claims. For example, a storm may impact a geographic area that includes at least one building that is insured by the company. The apparatuses, systems and methods described herein may be incorporated into an insurance claims process, which may be reflected in a recommended policyholder claim payment under the terms of an associated insurance contract. As described in detail herein, the system 300 may generate a probable roof loss confidence score for the roof of the building based upon base-line roof loss confidence score data (e.g., base-line probable roof loss confidence score data generated at the time of property insurance underwriting), weather data (e.g., a geographic area impacted by a storm, wind speed associated with a storm, wind direction associated with a storm, a length of time a storm impacted a particular geographic location, etc.), and/or hail data (e.g., a size of hail, a hardness of hail, a length of time hail impacted a geographic area, a three-dimensional shape of the hail, etc.).

In another example, the insurance company may implement the system 300 to predict a specific event that may result in property damage claims and a predicted set of characteristics corresponding to the specific event. For example, the specific event that may impact a geographic area that includes at least one building that is insured by the insurance company may be predicted minutes, hours, days, weeks, months, or years ahead of time. The specific event may include storms which may be characterized by high winds (may be associated with tornados, hurricanes, typhoons, etc.), rain, flooding, hail, lightning, snow, ice, falling objects (trees, power lines, etc.), or moving landmasses (mudslides, debris flows, avalanches, etc.). The specific event may include non-storm events that may result in property damage including fires (wildfires or structure fires), earthquakes, pests, or accidents (construction accidents, vehicle accidents, etc.). A predicted level of roof damage may be determined for the roof of the building based upon the predicted specific event and the predicted set of characteristics. For example, if the predicted specific event affecting the building is hail and the predicted set of characteristics is hail of less than 1 inch in diameter, the system may predict the level of roof damage as minimal. Conversely, if the predicted specific event affecting the buildings is a hurricane and the predicted set of characteristics is a category five hurricane, the system may predict the level of roof damage as critical. Additionally, the apparatuses, systems and methods, as described herein, may be incorporated into a property assessment process, and may be reflected in a recommended policyholder insurance premium under the terms of an associated insurance contract. As described in detail herein, the system 300 may predict the specific event and the set of characteristics based upon a generated probable roof loss confidence score for the roof of the building based upon, for example, base-line roof loss confidence score data (e.g., base-line probable roof loss confidence score data generated at the time of property insurance underwriting), weather data (e.g., a geographic area impacted by a storm, wind speed associated with a storm, wind direction associated with a storm, a length of time a storm impacted a particular geographic location, etc.), and/or hail data (e.g., a size of hail, a hardness of hail, a length of time hail impacted a geographic area, a three-dimensional shape of the hail, etc.).

Additionally, the apparatuses, systems and methods provided herein may be used to expedite property damage insurance claims associated with storm damage. This may include generating a probable building exterior damage confidence score for an exterior of at least one building or generating a base-line probable roof damage confidence score for a roof of at least one building. This may further include generating property insurance underwriting data based upon a base-line probable roof damage confidence score or generating a probable roof damage confidence score for a roof of at least one building. In some embodiments, this may include generating insurance property damage claim data based upon a probable roof damage confidence score or generating insurance property loss mitigation data based upon a probable roof damage confidence score.

Turning to FIGS. 1A-G, a building site 100*a-g* may include a building 142*c* physically located on a building site 140*c*. The building 142*c* may be oriented relative to geographic cardinal directions 139*c* within a building area 141*c*. The building 142*c* may include a plurality of roof sections 118*a,c,d*, 120*a,c,d*, 122*a,c,f*, 134*b,c,f*, 136*b,c,e*, 144*c,g*, 145*c,g*. As specifically illustrated with respect to FIGS. 1A and 1B, line 119*a* is tangent to a plane associated with roof section 118*a,c,d*; line 121*a* is tangent to a plane associated with roof section 120*a,c,d*; line 123*a* is tangent to a plane associated with roof section 122*a,c,f*; line 135*b* is tangent to a plane associated with roof section 134*b,c,f*; and line 119*a* is tangent to a plane associated with roof section 136*b,c,e*. As described herein, hail, wind, rain, etc. may impact any given roof section 118*a,c,d*, 120*a,c,d*, 122*a,c,f*, 134*b,c,f*, 136*b,c,e*, 144*c,g*, 145*c,g* relative to a respective tangent line 119*a*, 121*a*, 123*a*, 135*b*, 137*b* differently than any other roof section. In any event, a building site 140*c* may include an access drive 143*c*.

The building 142*c* may include a front 105*a* (i.e., the front 105*a* is oriented generally SSW with respect to geographic cardinal directions 139*c*) having exterior siding 106*a,b,d,e* (e.g., vinyl siding, wood siding, laminate siding, aluminum siding, etc.), cultured stone exterior 107*a,b,g*, shake exterior siding 108*a,d*, a front entrance door 109*a,d*, a sidelight 110*a,d*, a garage walk-in door 111*a,f*, a front porch window 112*a,d*, a picture window 113*a,d*, a two-car garage door 114*a,d* with windows 115*a,d*, and a one-car garage door 116*a,d* with windows 117*a,d*.

The building 142*c* may include a rear 148*e* (i.e., the rear 148*e* is oriented generally NNE with respect to geographic cardinal directions 139*c*) having a rear walk-in garage door 147*e*, rear windows 127*b,e*, 133*b,e*, sliding rear doors 128*b*, 132*b,f*, 146*e*, and a rear deck 130*b,f* with steps 131*b,f*.

The building 142*c* may include a first side 150*f* (i.e., the first end 150*f* is oriented generally WNW with respect to geographic cardinal directions 139*c*) having exterior windows 125*f*, 126*f* and basement exterior wall 124*f*. The building 142*c* may include a second side 151*g* (i.e., the second end 151*g* is oriented generally ESE with respect to geographic cardinal directions 139*c*) having exterior windows 149*g* and basement exterior wall 124*f*.

Figure 2A:
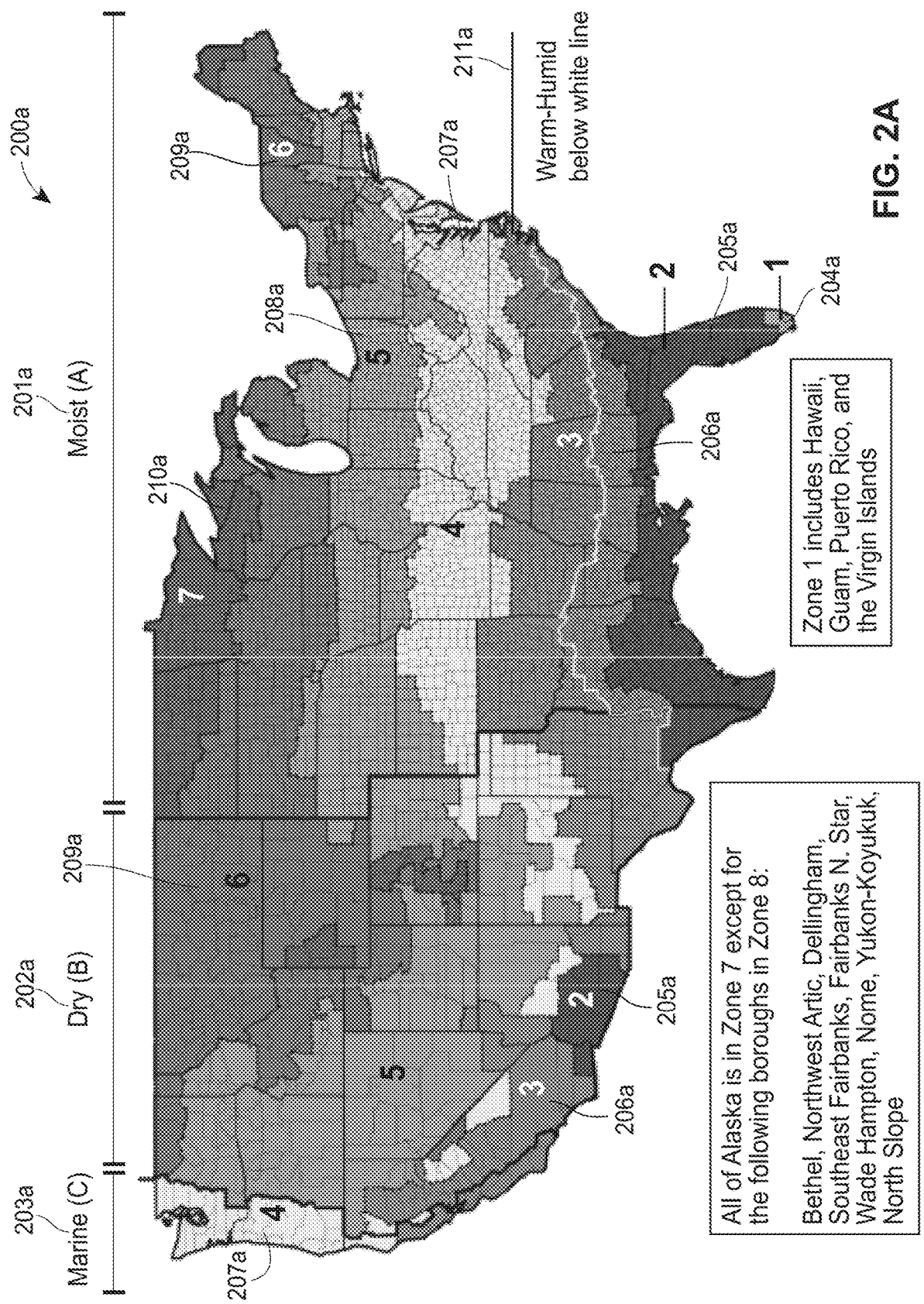
FIGS. 2A and 2B depict example climate zone information for the United States.
Figure 2B:
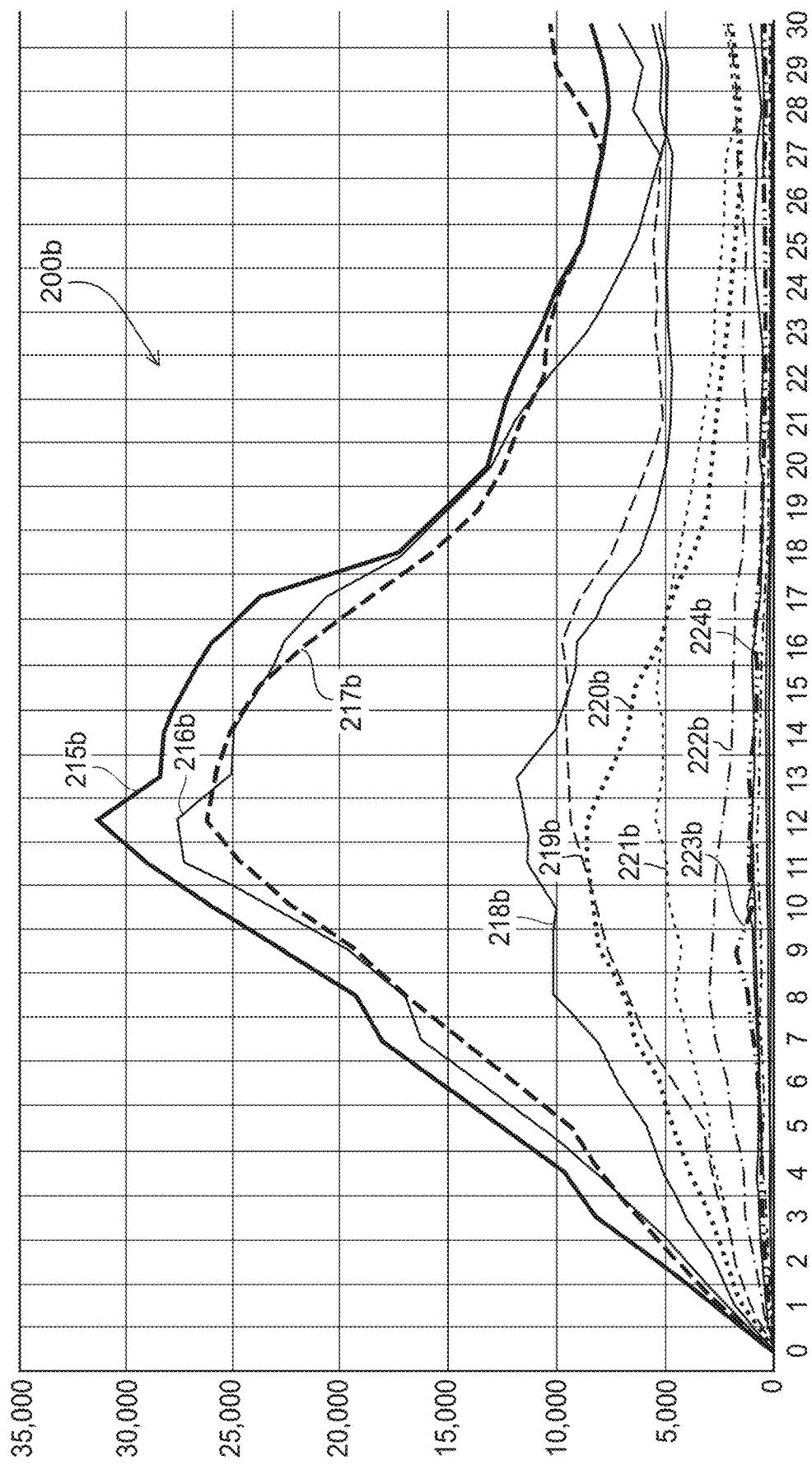

With reference to FIGS. 2A and 2B, climate zone information for the United States 200*a* may include three generally latitudinally extending columns 201a-203a (i.e., "moist (A)", "dry (B)", and "Marine (C)"), with each column 201a-203c divided into seven generally longitudinally extending rows 204a-210a (i.e., "Zones 1-7"). Each climate zone may then be referenced as, for example, "5A" or "4C" (i.e., climate zone graph lines 215b-224b).

As illustrated in FIG. 2B, a graph 200b may illustrate how exterior building material performance (e.g., roofing material, siding material, windows, gutters, down spouts, etc.) may vary with respect to a climate zone within which an associated building 142c is physically located. For example, a building located in climate zone 215b (i.e., climate zone 5A) may be more likely to experience building exterior damage (e.g., roof damage, siding damage, exterior widow damage, gutter damage, down spout damage, etc.) compared to a building located in climate zone 217b (i.e., climate zone 4C).

The X-Axis of the graph of FIG. 2B may, for example, be representative of a calculated roof age (CRA) for an asphalt composite shingle, shown as ranging from 0-30 years. The Y-Axis of the graph of FIG. 2B may, for example, be representative of a claim count, shown as ranging from 0-35,000. Certain assumptions may be employed to complete a respective data set that includes an estimated roof year (RY), if an actual roof year is, for example, not included in an initial insurance policy data extraction. Associated assumptions may include: 1) roof year (RY)=roof install year (RIY) (Notably, a roof year (RY) may be a prepopulated field in an insurance company policy master data set); 2) If the roof year (RY) field is blank in an associated entry of a roof data set, then roof year (RY)=Year Built (YB) (Notably, a year built (YB) is typically available data, and homes with a year built (YB) < or =30 years of age may be used as research has shown that the life cycle for most asphalt composition shingles is less than the designated 30 year period. Thus, an assumption may be made that a current roof is the original roof. Notably, an automated confirmation protocol may be incorporated to review if a policy for a particular building location has had a prior wind or hail claim that warranted a complete roof replacement (i.e., if yes, an updated Roof Year (RY) may be used)); and 3) a final formula for determining roof age may include a calculated roof age (CRA)=data extraction date (DED)–roof year (RY) (for example, if the data extraction date (DED) was year-end 2017 and the roof year (RY) was 2003, the calculated roof age (CRA) is equal to 14 years).

Figure 3:
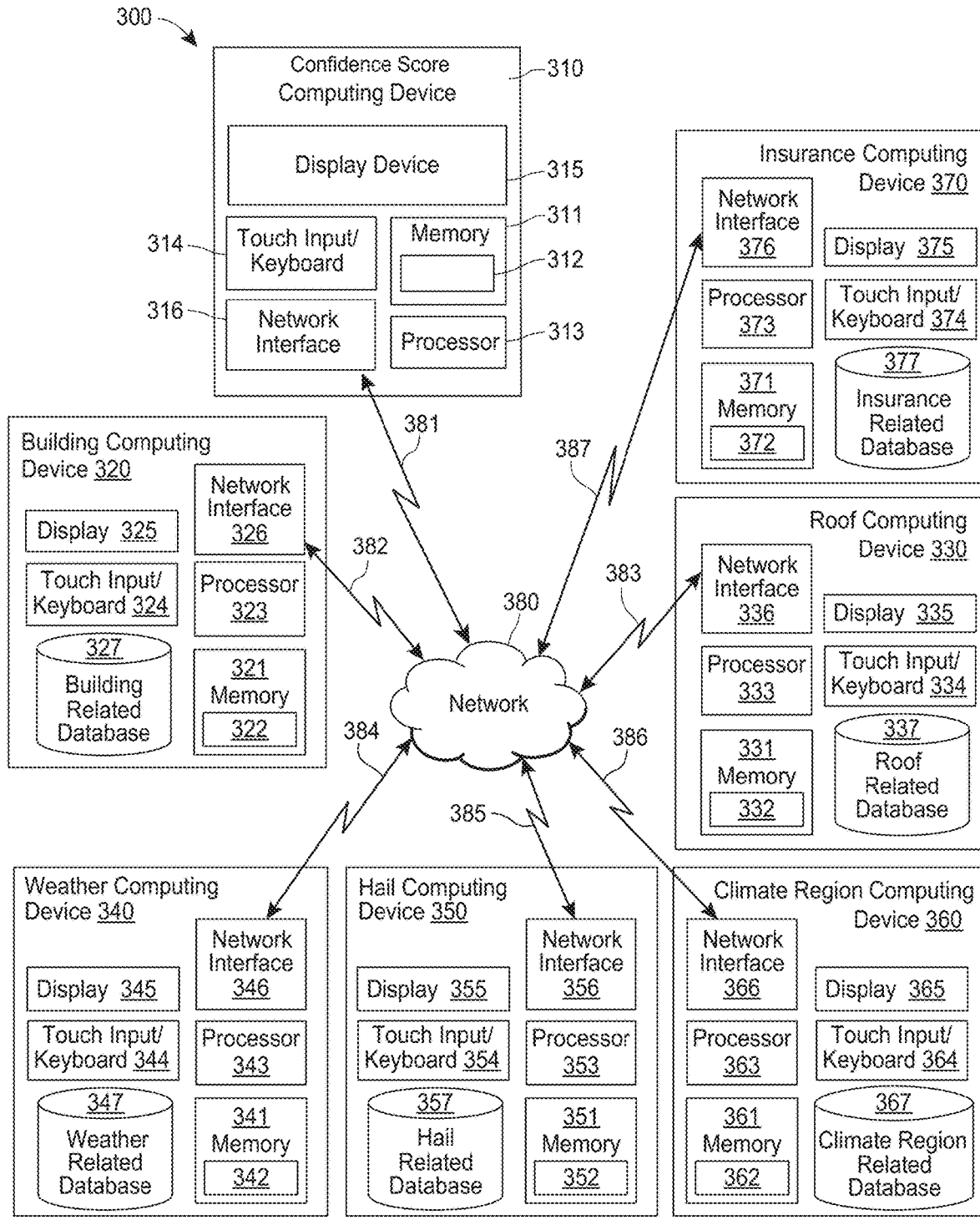
FIG. 3 depicts a block diagram of an example computer system related to property insurance.

Turning to FIG. 3, a computing system 300 related to property insurance may include, for example, a confidence score computing device 310, a building computing device 320, a roof computing device 330, a weather computing device 340, a hail computing device 350, a climate zone computing device 360, and an insurance computing device 370 communicatively connected to one another via a communications network 380. For clarity, only one confidence score computing device 310, one building computing device 320, one roof computing device 330, one weather computing device 340, one hail computing device 350, one climate zone computing device 360, and one insurance computing device 370 are depicted in FIG. 3. While only one of each device is depicted in FIG. 3, it should be understood that any number of the confidence score computing devices 310, building computing devices 320, roof computing devices 330, weather computing devices 340, hail computing devices 350, climate zone computing devices 360, or insurance computing device 370 may be supported within the system 300.

The confidence score computing device 310 may include a memory 311 and a processor 313 for storing and executing, respectively, a module 312. The module 312 may be, for example, stored on the memory 311 as a set of computer-readable instructions that, when executed by the processor 313, may cause the processor 313 to generate a base-line probable roof loss confidence score data, generate property insurance underwriting data, generate probable roof loss confidence score data, generate property insurance claims data, and/or generate property loss mitigation data. The confidence score computing device 310 may include a touch input/keyboard 314, a display device 315, and a network interface 316 configured to facilitate communications between the confidence score computing device 310, the building computing device 320, the roof computing device 330, the weather computing device 340, the hail computing device 350, the climate zone computing device 360, and the insurance computing device 370 via any hardwired or wireless communication network link 381, including for example a wireless LAN, MAN or WAN, WiFi, a wireless cellular telephone network, an Internet connection, or any combination thereof. Moreover, the confidence score computing device 310 may be communicatively connected to the building computing device 320, the roof computing device 330, the weather computing device 340, the hail computing device 350, the climate zone computing device 360, and the insurance computing device 370 via any suitable communication system, such as via any publicly available or privately owned communication network, including those that use wireless communication structures, such as wireless communication networks, including for example, wireless LANs and WANs, satellite and cellular telephone communication systems, etc.

The building computing device 320 may include a memory 321 and a processor 323 for storing and executing, respectively, a module 322. The module 322 may be, for example, stored on the memory 321 as a set of computer-readable instructions that, when executed by the processor 323, may cause the processor 323 to provide building data. The building computing device 320 may include a touch input/keyboard 324, a display device 325, and a network interface 326 configured to facilitate communications between the building computing device 320, the confidence score computing device 310, the roof computing device 330, the weather computing device 340, the hail computing device 350, the climate zone computing device 360, and the insurance computing device 370 via any hardwired or wireless communication network link 382, including for example a wireless LAN, MAN or WAN, WiFi, a wireless cellular telephone network, an Internet connection, or any combination thereof. Moreover, the building computing device 320 may be communicatively connected to the confidence score computing device 310, the roof computing device 330, the weather computing device 340, the hail computing device 350, the climate zone computing device 360, and the insurance computing device 370 via any suitable communication system, such as via any publicly available or privately owned communication network, including those that use wireless communication structures, such as wireless communication networks, including for example, wireless LANs and WANs, satellite and cellular telephone communication systems, etc.

The roof computing device 330 may include a memory 331 and a processor 333 for storing and executing, respectively, a module 332. The module 332 may be, for example, stored on the memory 331 as a set of computer-readable instructions that, when executed by the processor 333, may cause the processor 333 to generate or provide roof data. The roof computing device 330 may include a touch input/keyboard 334, a display device 335, and a network interface 336 configured to facilitate communications between the confidence roof device 330, the building computing device 320, the confidence score computing device 310, the weather computing device 340, the hail computing device 350, the climate zone computing device 360, and the insurance computing device 370 via any hardwired or wireless communication network link 383, including for example a wireless LAN, MAN or WAN, WiFi, a wireless cellular telephone network, an Internet connection, or any combination thereof. Moreover, the roof computing device 330 may be communicatively connected to the building computing device 320, the confidence score computing device 310, the weather computing device 340, the hail computing device 350, the climate zone computing device 360, and the insurance computing device 370 via any suitable communication system, such as via any publicly available or privately owned communication network, including those that use wireless communication structures, such as wireless communication networks, including for example, wireless LANs and WANs, satellite and cellular telephone communication systems, etc.

The weather computing device 340 may include a memory 341 and a processor 343 for storing and executing, respectively, a module 342. The module 342 may be, for example, stored on the memory 341 as a set of computer-readable instructions that, when executed by the processor 343, may cause the processor 343 to provide weather data. The weather computing device 340 may include a touch input/keyboard 344, a display device 345, and a network interface 346 configured to facilitate communications between the weather computing device 340, the building computing device 320, the roof computing device 330, the confidence score computing device 310, the hail computing device 350, the climate zone computing device 360, and the insurance computing device 370 via any hardwired or wireless communication network link 384, including for example a wireless LAN, MAN or WAN, WiFi, a wireless cellular telephone network, an Internet connection, or any combination thereof. Moreover, the weather computing device 340 may be communicatively connected to the building computing device 320, the roof computing device 330, the confidence score computing device 310, the hail computing device 350, the climate zone computing device 360, and the insurance computing device 370 via any suitable communication system, such as via any publicly available or privately owned communication network, including those that use wireless communication structures, such as wireless communication networks, including for example, wireless LANs and WANs, satellite and cellular telephone communication systems, etc.

The hail computing device 350 may include a memory 351 and a processor 353 for storing and executing, respectively, a module 352. The module 352 may be, for example, stored on the memory 351 as a set of computer-readable instructions that, when executed by the processor 353, may cause the processor 353 to provide hail data. The hail computing device 350 may include a touch input/keyboard 354, a display device 355, and a network interface 356 configured to facilitate communications between the hail computing device 350, the building computing device 320, the roof computing device 330, the weather computing device 340, the confidence score computing device 310, the climate zone computing device 360, and the insurance computing device 370 via any hardwired or wireless communication network link 385, including for example a wireless LAN, MAN or WAN, WiFi, a wireless cellular telephone network, an Internet connection, or any combination thereof. Moreover, the hail computing device 350 may be communicatively connected to the building computing device 320, the roof computing device 330, the weather computing device 340, the confidence score computing device 310, the climate zone computing device 360, and the insurance computing device 370 via any suitable communication system, such as via any publicly available or privately owned communication network, including those that use wireless communication structures, such as wireless communication networks, including for example, wireless LANs and WANs, satellite and cellular telephone communication systems, etc.

The climate zone computing device 360 may include a memory 361 and a processor 363 for storing and executing, respectively, a module 362. The module 362 may be, for example, stored on the memory 361 as a set of computer-readable instructions that, when executed by the processor 363, may cause the processor 363 to provide climate zone data. The climate zone computing device 360 may include a touch input/keyboard 364, a display device 365, and a network interface 366 configured to facilitate communications between the climate zone computing device 360, the building computing device 320, the roof computing device 330, the weather computing device 340, the hail computing device 350, the confidence score computing device 310, and the insurance computing device 370 via any hardwired or wireless communication network link 386, including for example a wireless LAN, MAN or WAN, WiFi, a wireless cellular telephone network, an Internet connection, or any combination thereof. Moreover, the climate zone computing device 360 may be communicatively connected to the confidence score computing device 310, the building computing device 320, the roof computing device 330, the weather computing device 340, the hail computing device 350, and the insurance computing device 370 via any suitable communication system, such as via any publicly available or privately owned communication network, including those that use wireless communication structures, such as wireless communication networks, including for example, wireless LANs and WANs, satellite and cellular telephone communication systems, etc.

The insurance computing device 370 may include a memory 371 and a processor 373 for storing and executing, respectively, a module 372. The module 372 may be, for example, stored on the memory 371 as a set of computer-readable instructions that, when executed by the processor 373, may cause the processor 373 to provide insurance data. The insurance computing device 370 may include a touch input/keyboard 374, a display device 375, and a network interface 376 configured to facilitate communications between the insurance computing device 370 and the confidence score computing device 310 the building computing device 320, the roof computing device 330, the weather computing device 340, the hail computing device 350, and the climate zone computing device 360 via any hardwired or wireless communication network link 387, including for example a wireless LAN, MAN or WAN, WiFi, a wireless cellular telephone network, an Internet connection, or any combination thereof. Moreover, the insurance computing device 370 may be communicatively connected to the confidence score computing device 310, the building computing device 320, the roof computing device 330, the weather computing device 340, the hail computing device 350, and the climate zone computing device 360 via any suitable communication system, such as via any publicly available or privately owned communication network, including those that use wireless communication structures, such as wireless communication networks, including for example, wireless LANs and WANs, satellite and cellular telephone communication systems, etc.

By distributing the memory/data and processing among the confidence score computing devices 310, the building computing devices 320, the roof computing devices 330, the weather computing devices 340, the hail computing devices 350, and the climate zone computing devices 360, and the insurance computing device 370, the overall capabilities of the system 300 may be optimized. Furthermore, the individual data sources (e.g., the building data, the roof data, the weather data, the hail data, and the climate zone data) may be updated and maintained by different entities. Therefore, updating and maintain the associated data is more efficient and secure.

Figure 4A:
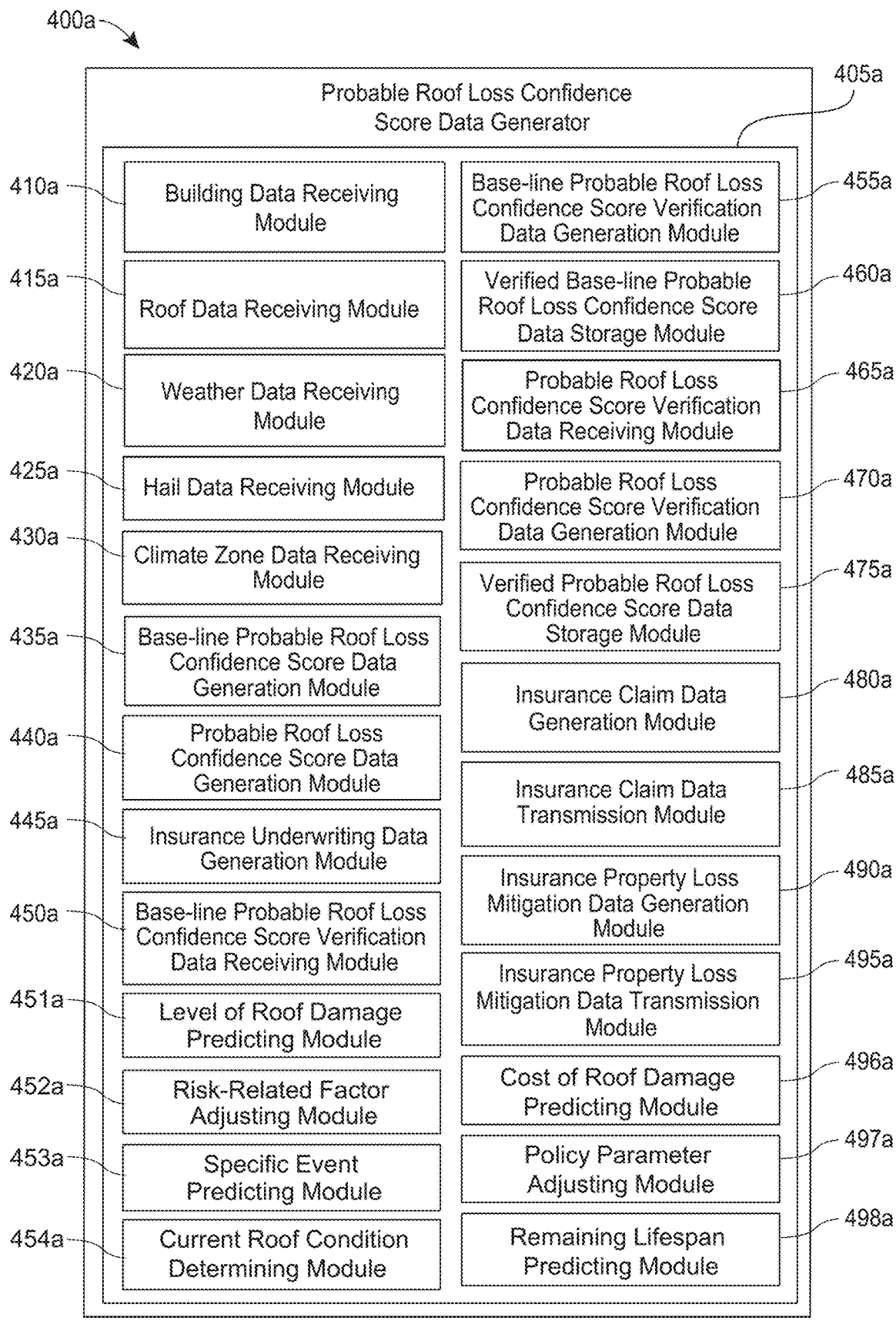
FIG. 4A depicts a block diagram of an example probable roof loss confidence score computing device.

With reference to FIG. 4A, a probable roof loss confidence score computing device 400a may include a building data receiving module 410a, a roof data receiving module 415a, a weather data receiving module 420a, a hail data receiving module 425a, a climate zone data receiving module 430a, a base-line probable roof loss confidence score data generation module 435a, a probable roof loss confidence score data generation module 440a, an insurance underwriting data generation module 445a, a base-line probable roof loss confidence score verification data receiving module 450a, a level of roof damage predicting module 451a, a risk-related factor adjusting module 452a, a specific event predicting module 453a, a base-line probable roof loss confidence score verification data generation module 455a, a verified base-line probable roof loss confidence score data storage module 460a, a probable roof loss confidence score verification data receiving module 465a, a probable roof loss confidence score verification data generation module 470a, a verified probable roof loss confidence score data storage module 475a, an insurance claim data generation module 480a, an insurance claim data transmission module 485a, an insurance property loss mitigation data generation module 490a, an insurance property loss mitigation data transmission module 495a, a cost of roof damage to predicting module 496a, policy parameter adjusting module 497a, and a remaining lifespan predicting module 498a stored on, for example, a memory 405a as a set of computer-readable instructions. The probable roof loss confidence score computing device 400a may be similar to, for example, the confidence score computing device 310 of FIG. 3.

Figure 4B:
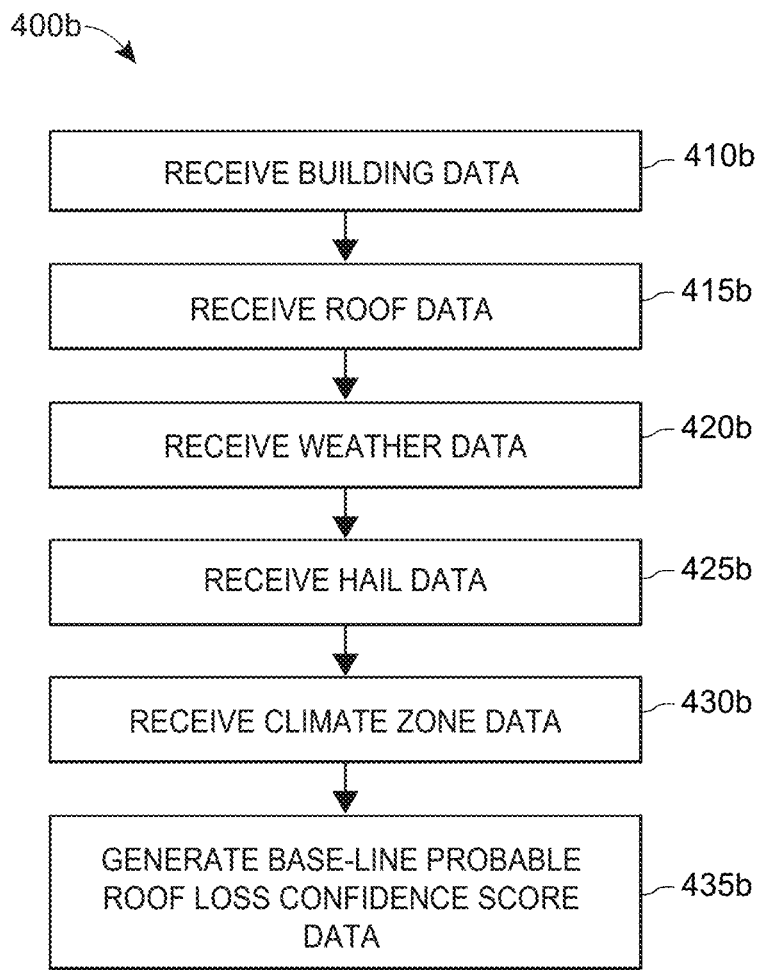
FIG. 4B depicts an example method of generating a base-line probable roof loss confidence score.

Turning to FIG. 4B, a method 400b of generating a base-line probable roof loss confidence score may be implemented by a processor (e.g., processor 313 of FIG. 3) executing, for example, at least a portion of the modules 410a-498a of FIG. 4A or the module 312 of FIG. 3. In particular, the processor 313 may execute the building data receiving module 410a to cause the processor 313 to, for example, receive building data from a building computing device 320 (block 410b). The building data may be representative of attributes of the building. Attributes of the building include at least one of: a geographic location of the building, a building orientation relative to geographic cardinal directions, whether the building is single story, whether the building is two story, whether the building is multi-story, whether there is tree cover over the building, location and height of structures surrounding the building, or elevation of terrain surrounding the building.

The processor 313 may execute the roof data receiving module 415a to cause the processor 313 to, for example, receive roof data from a roof computing device 430 based upon the building data (block 415b). The roof data may be representative of the roofing system covering the building. Alternatively, or additionally, the roof data may be representative of a structural truss system that forms the design and shape of the roof. Furthermore, the roof data may be representative of the roof sheathing, underlayment, roofing felt, membrane, self-adhered water and ice-dam protection membrane, tar, tar paper, exterior roofing material covering, roof vents, flashing and drip edges, and any other component comprising part of the overall roof surface covering of the building. The roof data may be representative of at least one of: a roofing product age, roof area, a roofing material type, a roofing design, a roofing configuration, a roofing product condition, whether a roof is a gable roof, whether a roof is a hip roof, a roof slope, a number of layers of roofing material, a roof deck condition, a roofing manufacturer product testing result, a roofing installation criteria, a roofing product impact testing result, a roofing product wind testing result, a roofing installation, whether a roofing product complies with a particular roof impact test standard or protocol, whether the roofing product is impact resistant rated, a roofing product impact resistance rating, a roofing product wind rating, a roofing shingle specification, whether a roofing product was installed during cold conditions with hand-sealed roofing cement, a roof underlayment, a roofing facer technology, a polyiso roofing insulation, an EPS insulation, whether a roof includes roof ventilation, an attic detail, a roofing product manufacture warranty, a roofing product installer warranty, or a roofing product third-party warranty.

The processor 313 may execute the weather data receiving module 420a to cause the processor 313 to, for example, receive historical weather data from a weather computing device 340 based upon the building data (block 420b). The historical weather data may be representative of storm attributes associated with historical storms that have occurred in a geographic area that includes a geographic location of the building. The attributes of the storm may include at least one of: a storm meteorological signature, a storm duration, a storm direction, thermal shock, whether a storm is conducive to producing damaging hail, whether a storm is conducive to producing strong winds, key meteorological aspects of a storm, length of time that the storm impacted the roof, a direction from which the storm impacts the building, a roof temperature prior to the storm, a roof temperature after the storm, or a thermal shock to roofing material.

The processor 313 may execute a hail data receiving module 425a to cause the processor 313 to, for example, receive historical hail data from a hail computing device based upon the building data (block 425b). The historical hail data may be representative of attributes of historical hail that has impacted a geographic area that includes the geographic location of the building. Attributes of the hail may include at least one of: a physical characteristic of the hail, a size of the hail, a shape of the hail, a density of the hail, a hardness of the hail, a range of hail sizes produced by a storm, or a resistance to flexing of the hail.

The processor 313 may execute the climate region data receiving module 430a to cause the processor 313 to, for example, receive climate region data from a climate zone computing device 360 based upon the building data (block 430b). The climate zone data may be representative of at least one of: a climate associated with a geographic location of the building; a humidity associated with a geographic location of the building, a temperature associated with a geographic location of the building, a moisture associated with a geographic location of the building, or whether a geographic location of the building is associated with a marine climate.

The processor 313 may execute the base-line probable roof loss confidence score data generation module 435a to cause the processor 313 to, for example, generate base-line probable roof loss confidence score data based upon the building data, the roof data, the weather data, the hail data, and the climate region data (block 435b). Execution of the base-line probable roof loss confidence score data generation module 435a may cause the processor 313 to implement a probability function to generate the base-line probable roof loss confidence score data (block 435b). A contribution of a first term of the probability function may be weighted, via a first weighting variable, relative to a second term of the probability function. The first term of the probability function may be based upon the roof data. The second term of the probability function may be based upon the hail data. The first weighting variable may be dynamically determined based upon at least one of: the building data, the roof data, the weather data, the hail data, or the climate region data. For example, if an associated building is located within a climate zone that does not experience hail, the hail data may be associated with a weighting variable value of zero.

Figure 4C:
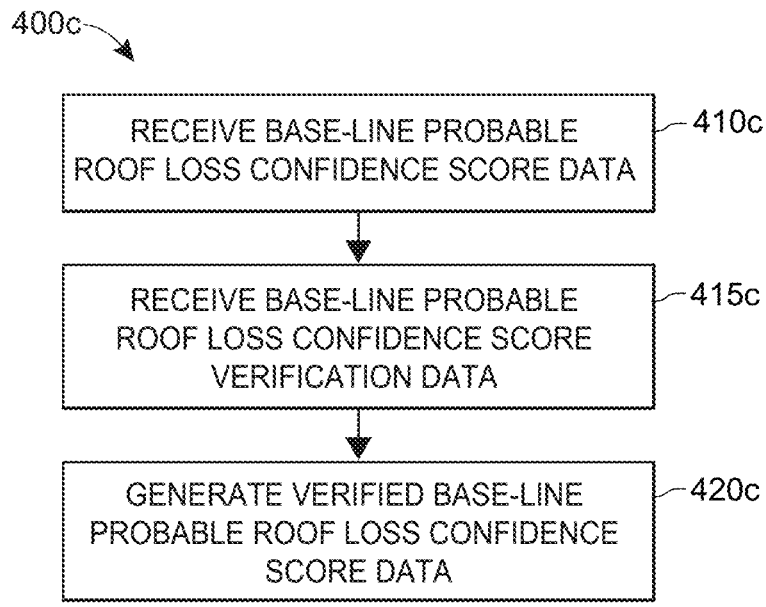
FIG. 4C depicts an example method of generating verified base-line probable roof loss confidence score data.

With reference to FIG. 4C, a method 400c of generating verified base-line probable roof loss confidence score data may be implemented by a processor (e.g., processor 313 of FIG. 3) executing, for example, at least a portion of the modules 410a-498a of FIG. 4A or the module 312 of FIG. 3. In particular, the processor 313 may receive the base-line probable roof loss confidence score data from block 435b (block 410c).

The processor 313 may execute the base-line probable roof loss confidence score verification data receiving module 450a to cause the processor 313 to, for example, receive base-line probable roof loss confidence score verification data (block 415c). The base-line probable roof loss confidence score verification data may be, for example, any of the variables (i.e., data) included in Table 1 below, and may be received from any one of the data sources included in Table 1. Alternatively or additionally, the probable roof loss confidence score verification data may be manually entered.

The processor 313 may execute the base-line probable roof loss confidence score verification data generation module 455a to cause the processor 313 to, for example, generate verified base-line probable roof loss confidence score data based upon a comparison of the base-line probable roof loss confidence score data with the base-line probable roof loss confidence score verification data (block 420c).

The processor 313 may execute the verified base-line probable roof loss confidence score data storage module 460a to cause the processor 313 to, for example, store the base-line probable roof loss confidence score data in, for example, the memory 311 if the processor 313 determines that the base-line probable roof loss confidence score data matches the base-line probable roof loss confidence score verification data (block 420c). Alternatively, the processor 313 may store the verified base-line probable roof loss confidence score data in, for example, the memory 311 if the processor 313 determines that the base-line probable roof loss confidence score data does not match the base-line probable roof loss confidence score verification data (block 420c).

TABLE 1

| Item | Variable | Data Source |
|---|---|---|
| A | Storm Signature (Meteorological) | Weather Vendor |
| B | Storm Duration | Weather Vendor |
| C | Storm Direction | Weather Vendor |
| D | Thermal Shock | Weather Vendor |
| E | Hail Size | Weather Vendor |
| F | Hail Shape | Claim File, Homeowner, Crowd Sourcing |
| G | Hail Density | Weather Vendor |
| H | Hail Hardness | Weather Vendor |
| I | Roofing Product Age | Policy Master Record, Year Built Basis, Claim Reason Codes (Total Roof Loss) |
| J | Roof Area | Policy Master Record, Real Property Vendor, or other vendor |
| K | Roofing Material Type | Policy Master Record, Claim Record, Real Property Vendor or other vendor |
| L | Roofing Design (Configuration) | Real Property Vendor or other vendor |
| M | Roof Slope | Real Property Vendor or other vendor |
| N | No. of Layers of Roofing | a Real Property Vendor, vendor Inspection or other vendor inspection, Claim Inspection |
| O | Roof Deck Condition | a Real Property Vendor, vendor Inspection, Claim Inspection |
| P | Roofing Impact Testing Rating | Policy Master Record (IRR Credit) |
| Q | Roofing Wind Testing Rating | Manufacturer Reference Material |
| R | Roof Proper Installation (Yes/No) | a Real Property Vendor, vendor Inspection, Claim Inspection |
| S | Climate Region | Pacific Northwest National Laboratory - U.S. Department of Energy's Building America Program |
| T | Physical Structure (Single Story, Two Story, Bi-Level) | Policy Master Record |
| U | On-Sight (Tree Cover Present) | a Real Property Vendor, vendor Inspection or other vendor inspection, Claim Inspection |

Figure 4D:
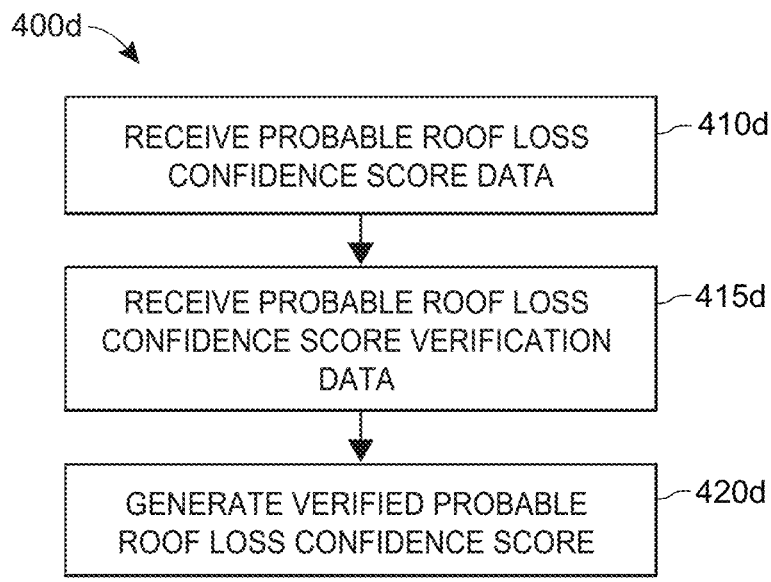
FIG. 4D depicts an example method of generating verified probable roof loss confidence score data.

Turning to FIG. 4D, a method 400d of generating verified probable roof loss confidence score data may be implemented by a processor (e.g., processor 313 of FIG. 3)

executing, for example, at least a portion of the modules 410a-498a of FIG. 4A or the module 312 of FIG. 3. In particular, the processor 313 may receive the probable roof loss confidence score data from block 425f (block 410d).

The processor 313 may execute the probable roof loss confidence score verification data receiving module 465a to cause the processor 313 to, for example, receive probable roof loss confidence score verification data (block 415d). The probable roof loss confidence score verification data may be, for example, any of the variables (i.e., data) included in Table 1, and may be received from any one of the data sources included in Table 1. Alternatively, or additionally the probable roof loss confidence score verification data may be manually entered.

The processor 313 may execute the probable roof loss confidence score verification data generation module 470a to cause the processor 313 to, for example, generate verified probable roof loss confidence score data based upon a comparison of the probable roof loss confidence score data with the probable roof loss confidence score verification data (block 420d).

The processor 313 may execute the verified probable roof loss confidence score data storage module 475a to cause the processor 313 to, for example, store the probable roof loss confidence score data in, for example, the memory 311 if the processor 313 determines that the probable roof loss confidence score data matches the probable roof loss confidence score verification data (block 420d). Alternatively, the processor 313 may store the verified probable roof loss confidence score data in, for example, the memory 311 if the processor 313 determines that the probable roof loss confidence score data does not match the probable roof loss confidence score verification data (block 420d).

Figure 4E:
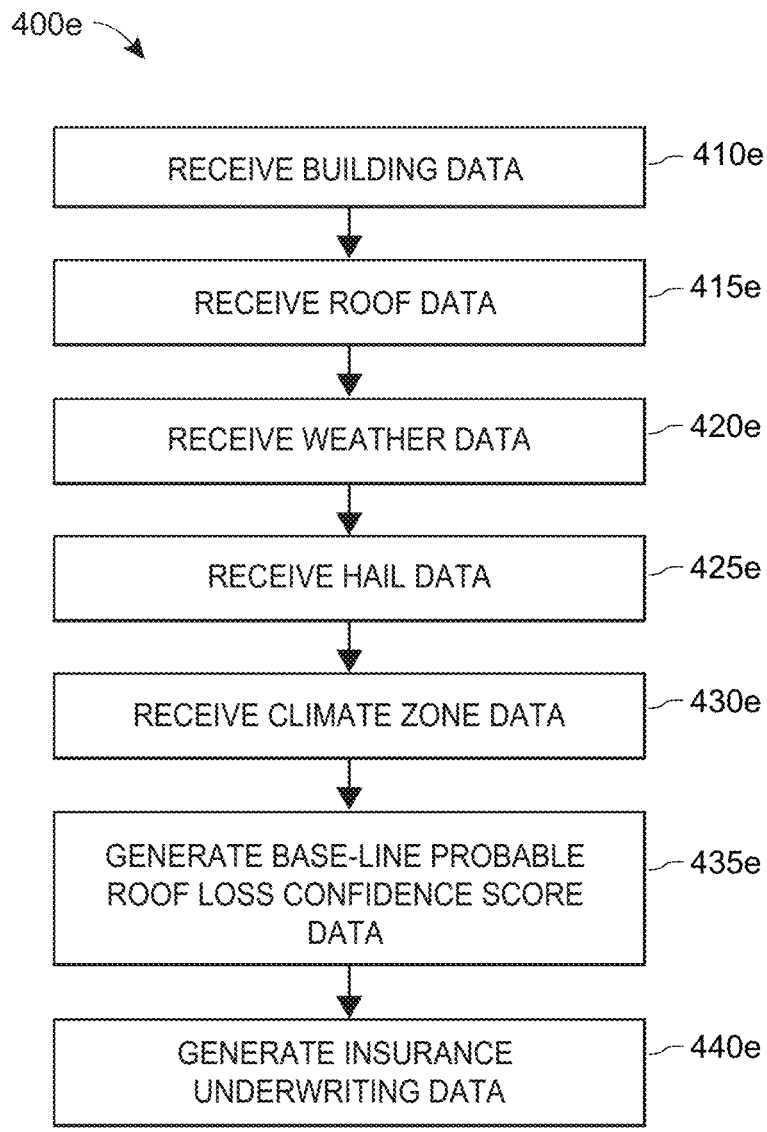
FIG. 4E depicts an example method of generating property insurance underwriting data based upon base-line probable roof loss confidence score data.

With reference to FIG. 4E, a method 400e of generating property insurance underwriting data based upon base-line probable roof loss confidence score data may be implemented by a processor (e.g., processor 313 of FIG. 3) executing, for example, at least a portion of the modules 410a-498a of FIG. 4A or the module 312 of FIG. 3. In particular, the processor 313 may execute the building data receiving module 410a to cause the processor 313 to, for example, receive building data from a building computing device 320 (block 410e). The building data may be representative of attributes of the building. Attributes of the building include at least one of: a geographic location of the building, a building orientation relative to geographic cardinal directions, whether the building is single story, whether the building is two story, whether the building is multi-story, whether there is tree cover over the building, location and height of structures surrounding the building, or elevation of terrain surrounding the building.

The processor 313 may execute the roof data receiving module 415a to cause the processor 313 to, for example, receive roof data from a roof computing device 430 based upon the building data (block 415e). The roof data may be representative of a structure forming an upper covering of the building. The roof data may be representative of the roofing system covering the building. Alternatively, or additionally, the roof data may be representative of a structural truss system that forms the design and shape of the roof. Furthermore, the roof data may be representative of the roof sheathing, underlayment, roofing felt, membrane, self-adhered water and ice-dam protection membrane, tar, tar paper, exterior roofing material covering, roof vents, flashing and drip edges, and any other component comprising part of the overall roof surface covering of the building. The roof data may be representative of at least one of: a roofing product age, roof area, a roofing material type, a roofing design, a roofing configuration, a roofing product condition, whether a roof is a gable roof, whether a roof is a hip roof, a roof slope, a number of layers of roofing material, a roof deck condition, a roofing manufacturer product testing result, a roofing installation criteria, a roofing product impact testing result, a roofing product wind testing result, a roofing installation, whether a roofing product complies with a particular roof impact test standard or protocol, whether the roofing product is impact resistant rated, a roofing product impact resistance rating, a roofing product wind rating, a roofing shingle specification, whether a roofing product was installed during cold conditions with hand-sealed roofing cement, a roof underlayment, a roofing facer technology, a polyiso roofing insulation, an EPS insulation, whether a roof includes roof ventilation, an attic detail, a roofing product manufacture warranty, a roofing product installer warranty, or a roofing product third-party warranty.

The processor 313 may execute the weather data receiving module 420a to cause the processor 313 to, for example, receive historical weather data from a weather computing device 340 based upon the building data (block 420e). The historical weather data may be representative of storm attributes associated with historical storms that have occurred in a geographic area that includes a geographic location of the building. The attributes of the storm may include at least one of: a storm meteorological signature, a storm duration, a storm direction, thermal shock, whether a storm is conducive to producing damaging hail, whether a storm is conducive to producing strong winds, key meteorological aspects of a storm, length of time that the storm impacted the roof, a direction from which the storm impacts the building, a roof temperature prior to the storm, a roof temperature after the storm, or a thermal shock to roofing material.

The processor 313 may execute a hail data receiving module 425a to cause the processor 313 to, for example, receive historical hail data from a hail computing device based upon the building data (block 425e). The historical hail data may be representative of attributes of historical hail that has impacted a geographic area that includes the geographic location of the building. Attributes of the hail may include at least one of: a physical characteristic of the hail, a size of the hail, a shape of the hail, a density of the hail, a hardness of the hail, a range of hail sizes produced by a storm, or a resistance to flexing of the hail.

The processor 313 may execute the climate region data receiving module 430a to cause the processor 313 to, for example, receive climate region data from a climate zone computing device 360 based upon the building data (block 430e). The climate zone data may be representative of at least one of: a climate associated with a geographic location of the building; a humidity associated with a geographic location of the building, a temperature associated with a geographic location of the building, a moisture associated with a geographic location of the building, or whether a geographic location of the building is associated with a marine climate.

The processor 313 may execute the base-line probable roof loss confidence score data generation module 435a to cause the processor 313 to, for example, generate base-line probable roof loss confidence score data based upon the building data, the roof data, the weather data, the hail data, and the climate region data (block 435e). Execution of the base-line probable roof loss confidence score data generation module 435a may cause the processor 313 to implement a probability function to generate the base-line probable roof loss confidence score data (block 435e). A contribution of a first term of the probability function may be weighted, via a first weighting variable, relative to a second term of the probability function. The first term of the probability function may be based upon the roof data. The second term of the probability function may be based upon the hail data. The first weighting variable may be dynamically determined based upon at least one of: the building data, the roof data, the weather data, the hail data, or the climate region data. For example, if an associated building is located within a climate zone that does not experience hail, the hail data may be associated with a weighting variable value of zero.

The processor 313 may execute the insurance underwriting data generation module 445a to cause the processor 313 to, for example, generate insurance underwriting data based upon the base-line probable roof loss confidence score data (block 440e).

Figure 4F:
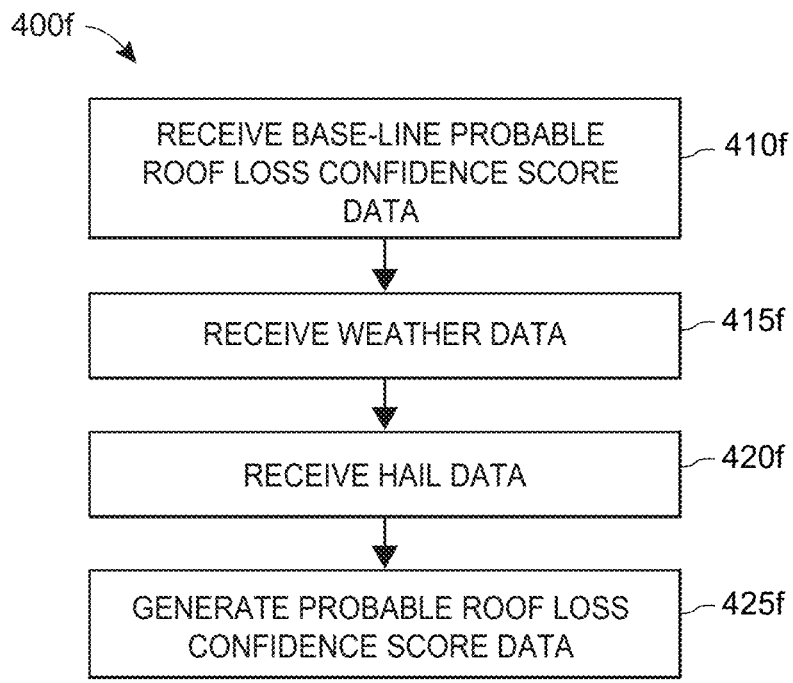
FIG. 4F depicts an example method of generating a probable roof loss confidence score.

Turning to FIG. 4F, a method 400f of generating a probable roof loss confidence score may be implemented by a processor (e.g., processor 313 of FIG. 3) executing, for example, at least a portion of the modules 410a-498a of FIG. 4A or the module 312 of FIG. 3. In particular, the processor 313 may receive the base-line probable roof loss confidence score data from block 435b (block 410f). The processor 313 may execute the weather data receiving module 420a to cause the processor 313 to, for example, receive weather data from a weather computing device 340 (block 415f). The weather data may be representative of storm attributes associated with storms that have recently occurred in a geographic area that includes a geographic location of the building. The attributes of the storm may include at least one of: a storm meteorological signature, a storm duration, a storm direction, thermal shock, whether a storm is conducive to producing damaging hail, whether a storm is conducive to producing strong winds, key meteorological aspects of a storm, length of time that the storm impacted the roof, a direction from which the storm impacts the building, a roof temperature prior to the storm, a roof temperature after the storm, or a thermal shock to roofing material.

The processor 313 may execute a hail data receiving module 425a to cause the processor 313 to, for example, receive hail data from a hail computing device based upon the building data (block 420f). The hail data may be representative of attributes of hail that has recently impacted a geographic area that includes the geographic location of the building. Attributes of the hail may include at least one of: a physical characteristic of the hail, a size of the hail, a shape of the hail, a density of the hail, a hardness of the hail, a range of hail sizes produced by a storm, or a resistance to flexing of the hail.

The processor 313 may execute a probable roof loss confidence score data generation module 440a to cause the processor 313 to, for example, generate probable roof loss confidence score data based upon the base-line probable roof loss confidence score data, the weather data, and the hail data (block 425f). Execution of the probable roof loss confidence score data generation module 440a may cause the processor 313 to implement a probability function to generate the base-line probable roof loss confidence score data (block 425f). A contribution of a first term of the probability function may be weighted, via a first weighting variable, relative to a second term of the probability function. The first term of the probability function may be based upon the roof data. The second term of the probability function may be based upon the hail data. The first weighting variable may be dynamically determined based upon at least one of: the base-line probable roof loss confidence score data, the weather data, or the hail data. For example, if an associated building is located within a climate zone that does not experience hail, the hail data may be associated with a weighting variable value of zero.

The probable roof loss confidence score data may be, for example, representative of a binary value (i.e., either a roof of the building is determined to be a total loss, or not). Alternatively, the probable roof loss confidence score data may be, for example, representative of a continuous value (i.e., a probability of the roof of the building being a total loss is determined). If the probability is less than some value (e.g., 50%), a manual verification of a roof loss claim may be performed. If the probability is greater than some value (e.g., 50%), the processor may automatically process an associated roof loss claim.

Figure 4G:
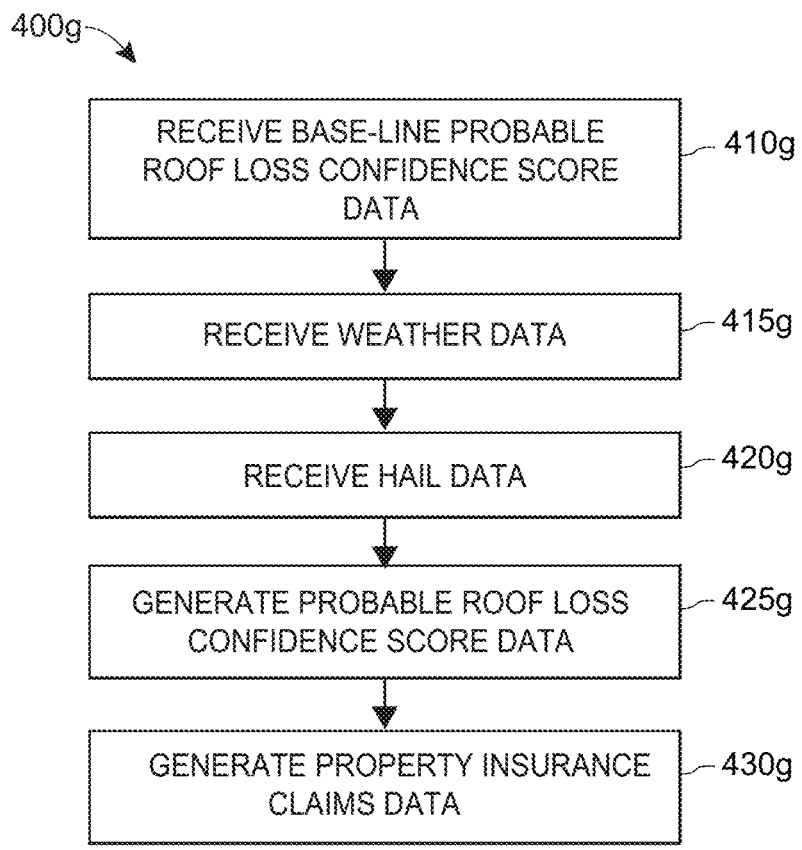
FIG. 4G depicts an example method of generating property insurance claims data based upon probable roof loss confidence score data.

With reference to FIG. 4G, a method 400g of generating property insurance claims data based upon probable roof loss confidence score data may be implemented by a processor (e.g., processor 313 of FIG. 3) executing, for example, at least a portion of the modules 410a-498a of FIG. 4A or the module 312 of FIG. 3. In particular, the processor 313 may receive the base-line probable roof loss confidence score data from block 435b (block 410g). The processor 313 may execute the weather data receiving module 420a to cause the processor 313 to, for example, receive weather data from a weather computing device 340 (block 415g). The weather data may be representative of storm attributes associated with storms that have recently occurred in a geographic area that includes a geographic location of the building. The attributes of the storm may include at least one of: a storm meteorological signature, a storm duration, a storm direction, thermal shock, whether a storm is conducive to producing damaging hail, whether a storm is conducive to producing strong winds, key meteorological aspects of a storm, length of time that the storm impacted the roof, a direction from which the storm impacts the building, a roof temperature prior to the storm, a roof temperature after the storm, or a thermal shock to roofing material.

The processor 313 may execute a hail data receiving module 425a to cause the processor 313 to, for example, receive hail data from a hail computing device based upon the building data (block 420g). The hail data may be representative of attributes of hail that has recently impacted a geographic area that includes the geographic location of the building. Attributes of the hail may include at least one of: a physical characteristic of the hail, a size of the hail, a shape of the hail, a density of the hail, a hardness of the hail, a range of hail sizes produced by a storm, or a resistance to flexing of the hail.

The processor 313 may execute a probable roof loss confidence score data generation module 440a to cause the processor 313 to, for example, generate probable roof loss confidence score data based upon the base-line probable roof loss confidence score data, the weather data, and the hail data (block 425g). Execution of the probable roof loss confidence score data generation module 440a may cause the processor 313 to implement a probability function to generate the base-line probable roof loss confidence score data (block 425g). A contribution of a first term of the probability function may be weighted, via a first weighting variable, relative to a second term of the probability function. The first term of the probability function may be based upon the roof data. The second term of the probability function may be based upon the hail data. The first weighting variable may be dynamically determined based upon at least one of: the base-line probable roof loss confidence score data, the weather data, or the hail data. For example, if an associated building is located within a climate zone that does not experience hail, the hail data may be associated with a weighting variable value of zero.

The processor 313 may execute an insurance claim data generation module 480a to cause the processor 313 to, for example, generate insurance claim data based upon the probable roof loss confidence score data (block 430g). The probable roof loss confidence score data may be, for example, representative of a binary value (i.e., either a roof of the building is determined to be a total loss, or not). Alternatively, the probable roof loss confidence score data may be, for example, representative of a continuous value (i.e., a probability of the roof of the building being a total loss is determined). If the probability is less than some value (e.g., 50%), a manual verification of a roof loss claim may be performed. If the probability is greater than some value (e.g., 50%), the processor may automatically process an associated roof loss claim.

The processor 313 may execute an insurance claim data transmission module 485a to cause the processor 313 to, for example, settle an insurance claim (block 430g). For example, the processor 313 may cause a notification to be sent to an insurance adjustor, or may cause a payment to be automatically transmitted to a building owner or a repair vendor.

Figure 4H:
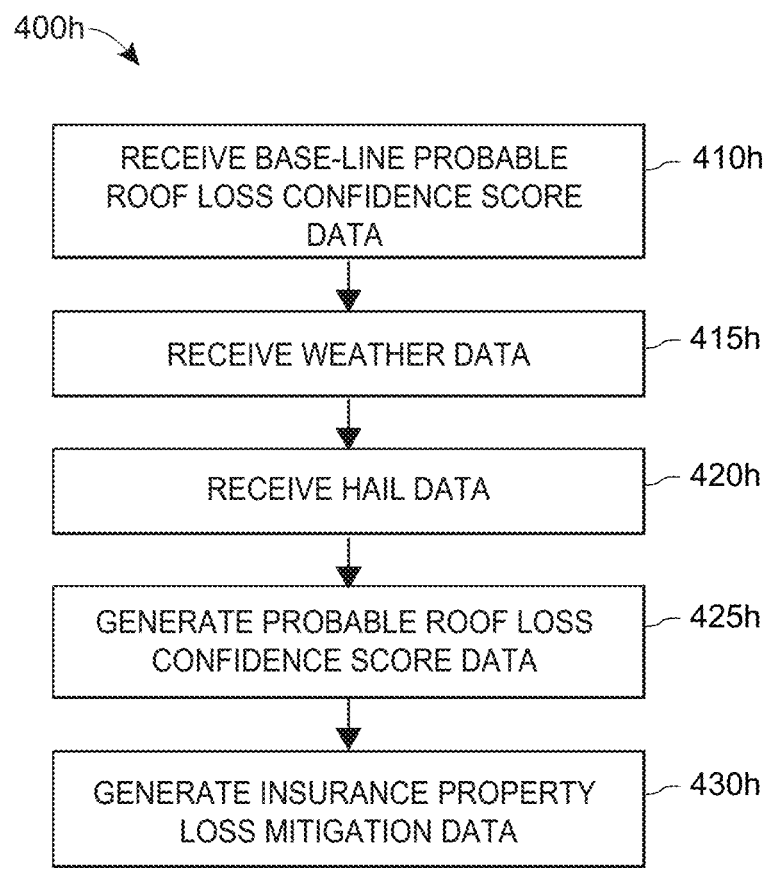
FIG. 4H depicts an example method of generating insurance property loss mitigation data based upon probable roof loss confidence score data.

Turning to FIG. 4H, a method 400h of generating insurance property loss mitigation data based upon probable roof loss confidence score data may be implemented by a processor (e.g., processor 313 of FIG. 3) executing, for example, at least a portion of the modules 410a-498a of FIG. 4A or the module 312 of FIG. 3. In particular, the processor 313 may receive the base-line probable roof loss confidence score data from block 435b (block 410h). The processor 313 may execute the weather data receiving module 420a to cause the processor 313 to, for example, receive weather data from a weather computing device 340 (block 415h). The weather data may be representative of storm attributes associated with storms that have recently occurred in a geographic area that includes a geographic location of the building. The attributes of the storm may include at least one of: a storm meteorological signature, a storm duration, a storm direction, thermal shock, whether a storm is conducive to producing damaging hail, whether a storm is conducive to producing strong winds, key meteorological aspects of a storm, length of time that the storm impacted the roof, a direction from which the storm impacts the building, a roof temperature prior to the storm, a roof temperature after the storm, or a thermal shock to roofing material.

The processor 313 may execute a hail data receiving module 425a to cause the processor 313 to, for example, receive hail data from a hail computing device based upon the building data (block 420h). The hail data may be representative of attributes of hail that has recently impacted a geographic area that includes the geographic location of the building. Attributes of the hail may include at least one of: a physical characteristic of the hail, a size of the hail, a shape of the hail, a density of the hail, a hardness of the hail, a range of hail sizes produced by a storm, or a resistance to flexing of the hail.

The processor 313 may execute a probable roof loss confidence score data generation module 440a to cause the processor 313 to, for example, generate probable roof loss confidence score data based upon the base-line probable roof loss confidence score data, the weather data, and the hail data (block 425h). Execution of the probable roof loss confidence score data generation module 440a may cause the processor 313 to implement a probability function to generate the base-line probable roof loss confidence score data (block 425h). A contribution of a first term of the probability function may be weighted, via a first weighting variable, relative to a second term of the probability function. The first term of the probability function may be based upon the roof data. The second term of the probability function may be based upon the hail data. The first weighting variable may be dynamically determined based upon at least one of: the base-line probable roof loss confidence score data, the weather data, or the hail data. For example, if an associated building is located within a climate zone that does not experience hail, the hail data may be associated with a weighting variable value of zero.

The processor 313 may execute an insurance property loss mitigation data generation module 490a to cause the processor 313 to, for example, generate insurance claim data based upon the probable roof loss confidence score data (block 430h). The probable roof loss confidence score data may be, for example, representative of a binary value (i.e., either a roof of the building is determined to be a total loss, or not). Alternatively, the probable roof loss confidence score data may be, for example, representative of a continuous value (i.e., a probability of the roof of the building being a total loss is determined). If the probability is less than some value (e.g., 50%), a manual verification of a roof loss claim may be performed. If the probability is greater than some value (e.g., 50%), the processor may automatically process an associated roof loss claim.

The processor 313 may execute an insurance property loss mitigation data transmission module 495a to cause the processor 313 to, for example, mitigate property loss (block 430h). For example, the processor 313 may cause a notification to be sent to an insurance adjustor, or may cause a payment to be automatically transmitted to a repair vendor.

Figure 4I:
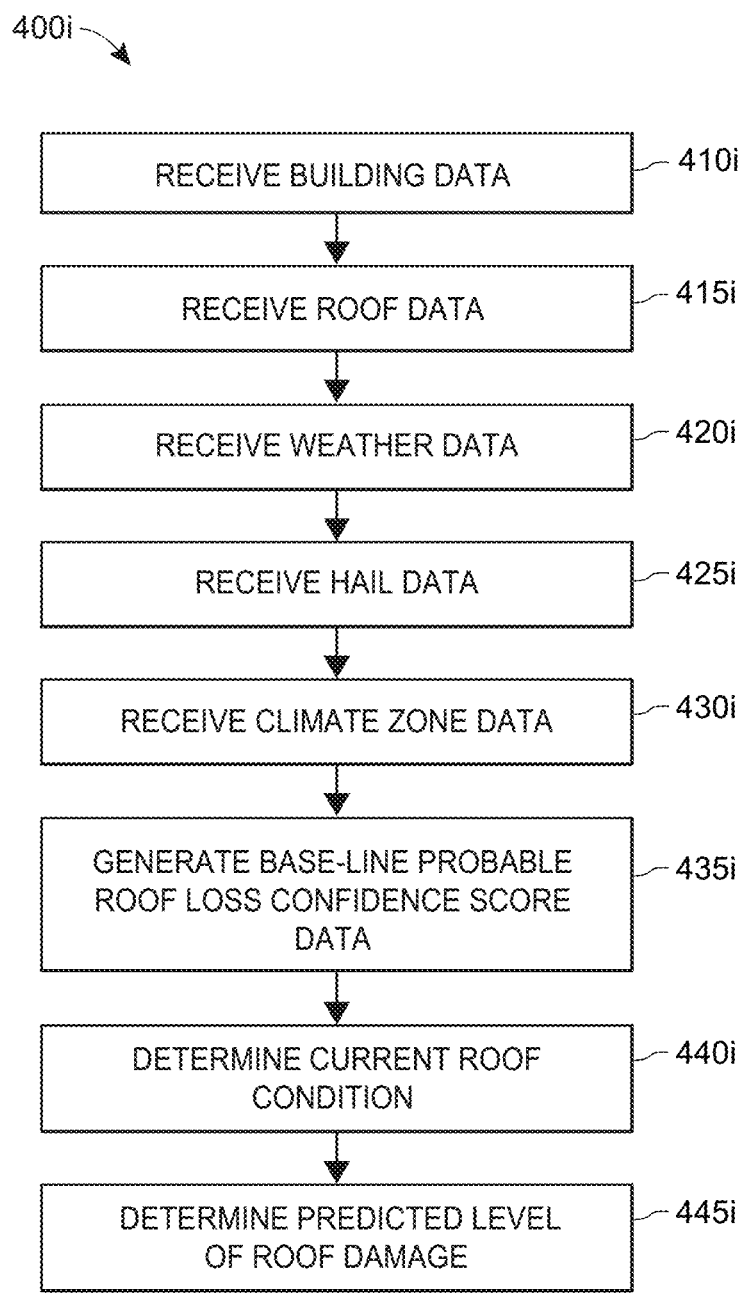
FIG. 4I depicts an example method of determining predicted level of roof damage based upon probable roof loss confidence score data.

Turning to FIG. 4I, a method 400i of determining a predicted level of roof damage to a building may be implemented. Although the method may be shown as being implemented by a processor (e.g., processor 313 of FIG. 3) executing, for example, at least a portion of the modules 410a-498a of FIG. 4A or the module 312 of FIG. 3, the method may be implemented using other components. The method 400i may also be used to improve the accuracy of damage predictions based upon a base-line probable roof loss confidence score and a current condition of the roof. The method of determining a predicted level of roof damage to a building may begin with receiving building data, roof data, weather data, hail data, and climate zone data. Then the method may generate the base-line probable roof loss confidence score. Finally, the method may determine the predicted level of roof damage to the building.

In particular, the processor 313 may execute the building data receiving module 410a to cause the processor 313 to, for example, receive building data from a building computing device 320 (block 410i). The building data may be representative of attributes of the building. Attributes of the building include at least one of: a geographic location of the building, a building orientation relative to geographic cardinal directions, whether the building is single story, whether the building is two story, whether the building is multi-story, whether there is tree cover over the building, location and height of structures surrounding the building, or elevation of terrain surrounding the building.

The processor 313 may execute the roof data receiving module 415a to cause the processor 313 to, for example, receive roof data from a roof computing device 430 based upon the building data (block 415i). The roof data may be representative of a structure forming an upper covering of the building. The roof data may be representative of the roofing system covering the building. Alternatively, or additionally, the roof data may be representative of a structural truss system that forms the design and shape of the roof. Furthermore, the roof data may be representative of the roof sheathing, underlayment, roofing felt, membrane, self-adhered water and ice-dam protection membrane, tar, tar paper, exterior roofing material covering, roof vents, flashing and drip edges, and any other component comprising part of the overall roof surface covering of the building. The roof data may be representative of at least one of: a roofing product age, roof area, a roofing material type, a roofing design, a roofing configuration, a roofing product condition, whether a roof is a gable roof, whether a roof is a hip roof, a roof slope, a number of layers of roofing material, a roof deck condition, a roofing manufacturer product testing result, a roofing installation criteria, a roofing product impact testing result, a roofing product wind testing result, a roofing installation, whether a roofing product complies with a particular roof impact test standard or protocol, whether the roofing product is impact resistant rated, a roofing product impact resistance rating, a roofing product wind rating, a roofing shingle specification, whether a roofing product was installed during cold conditions with hand-sealed roofing cement, a roof underlayment, a roofing facer technology, a polyiso roofing insulation, an EPS insulation, whether a roof includes roof ventilation, an attic detail, a roofing product manufacture warranty, a roofing product installer warranty, or a roofing product third-party warranty.

The processor 313 may execute the weather data receiving module 420a to cause the processor 313 to, for example, receive historical weather data from a weather computing device 340 based upon the building data (block 420i). The historical weather data may be representative of storm attributes associated with historical storms that have occurred in a geographic area that includes a geographic location of the building. The attributes of the storm may include at least one of: a storm meteorological signature, a storm duration, a storm direction, thermal shock, whether a storm is conducive to producing damaging hail, whether a storm is conducive to producing strong winds, key meteorological aspects of a storm, length of time that the storm impacted the roof, a direction from which the storm impacts the building, a roof temperature prior to the storm, a roof temperature after the storm, or a thermal shock to roofing material.

The processor 313 may execute a hail data receiving module 425a to cause the processor 313 to, for example, receive historical hail data from a hail computing device based upon the building data (block 425i). The historical hail data may be representative of attributes of historical hail that has impacted a geographic area that includes the geographic location of the building. Attributes of the hail may include at least one of: a physical characteristic of the hail, a size of the hail, a shape of the hail, a density of the hail, a hardness of the hail, a range of hail sizes produced by a storm, or a resistance to flexing of the hail.

The processor 313 may execute the climate region data receiving module 430a to cause the processor 313 to, for example, receive climate region data from a climate zone computing device 360 based upon the building data (block 430i). The climate zone data may be representative of at least one of: a climate associated with a geographic location of the building; a humidity associated with a geographic location of the building, a temperature associated with a geographic location of the building, a moisture associated with a geographic location of the building, or whether a geographic location of the building is associated with a marine climate.

The processor 313 may execute the base-line probable roof loss confidence score data generation module 435a to cause the processor 313 to, for example, generate base-line probable roof loss confidence score data based upon the building data, the roof data, the weather data, the hail data, and the climate region data (block 435i). Execution of the base-line probable roof loss confidence score data generation module 435a may cause the processor 313 to implement a probability function to generate the base-line probable roof loss confidence score data (block 435i). A contribution of a first term of the probability function may be weighted, via a first weighting variable, relative to a second term of the probability function. The first term of the probability function may be based upon the roof data. The second term of the probability function may be based upon the hail data. The first weighting variable may be dynamically determined based upon at least one of: the building data, the roof data, the weather data, the hail data, or the climate region data. For example, if an associated building is located within a climate zone that does not experience hail, the hail data may be associated with a weighting variable value of zero.

The processor 313 may execute the current roof condition determining module 454a to cause the processor 313 to, for example, determine the current roof condition based upon building data and roof data (block 440i). The determining of the current roof condition may additionally be based on hail data, weather data, climate data, or insurance data. The current roof condition may include the remaining lifespan of the roof, the current age of the roof, a history of repair done to the roof, a history of damage done to the roof, etc. The determination of the current roof condition may be transmitted to an insurer, a property inspector, a property repairer, etc.

The processor 313 may execute the level of roof damage predicting module 451a to cause the processor 313 to, for example, predict the level of roof damage based upon the base-line probable roof loss confidence score data (block 445i). The prediction of the level of roof damage may be for only a predicted remaining lifespan of the roof or building. The prediction of the level of roof damage may additionally be based on the current condition of the roof. The prediction of the level of roof damage may be transmitted to an insurer, a property inspector, a property repairer, etc.

Figure 4J:
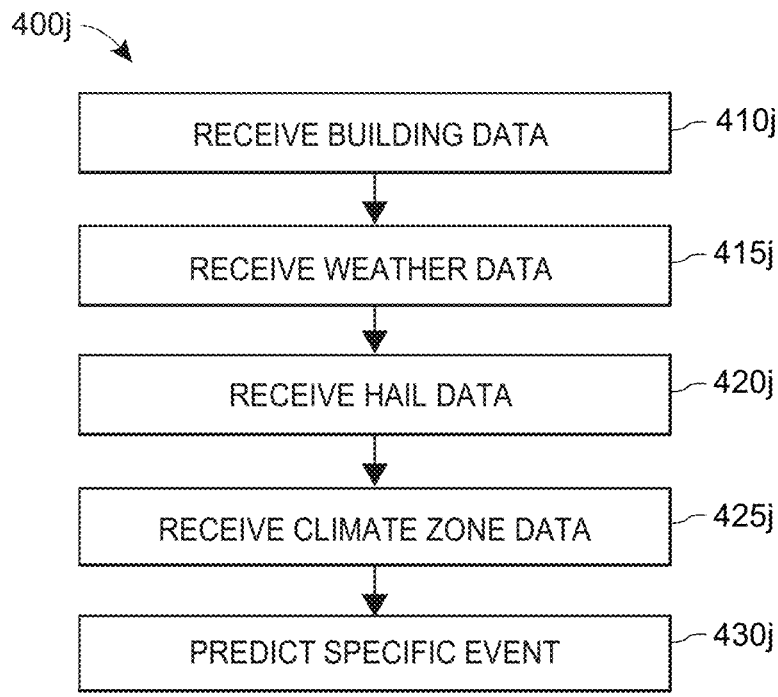
FIG. 4J depicts an example method of predicting a specific event based upon building location data.

Turning to FIG. 4J, a method 400j of determining a predicted specific event and a predicted set of characteristics of the predicted specific event may be implemented. Although the method may be shown as being implemented by a processor (e.g., processor 313 of FIG. 3) executing, for example, at least a portion of the modules 410a-498a of FIG. 4A or the module 312 of FIG. 3, the method may be implemented using other components. The method may be used to improve the accuracy of predicting specific events (high winds, hail storms, hurricanes, tornados, etc.), specific characteristics of the events (frequency of the specific event, or severity of the specific event, e.g., wind speeds or direction, hail size, hurricane and tornado classifications, etc.) at a location. The method may also be used to improve the accuracy of predicting an outcome from the specific event (e.g., predict the level of roof damage due to the specific event, predict the cost of roof damage due to the specific event, etc.). The method of determining a predicted specific event and a predicted set of characteristics of the specific event may begin with receiving building data, roof data, weather data, hail data, and climate zone data. Then the method may determine a predicted specific event and a predicted set of characteristics of the specific event based on the received data.

In particular, the processor 313 may execute the building data receiving module 410*a* to cause the processor 313 to, for example, receive building data from a building computing device 320 (block 410*j*). The building data may be representative of attributes of the building. Attributes of the building include at least one of: a geographic location of the building, a building orientation relative to geographic cardinal directions, whether the building is single story, whether the building is two story, whether the building is multi-story, whether there is tree cover over the building, location and height of structures surrounding the building, or elevation of terrain surrounding the building.

The processor 313 may execute the weather data receiving module 420*a* to cause the processor 313 to, for example, receive historical weather data from a weather computing device 340 based upon the building data (block 415*j*). The historical weather data may be representative of storm attributes associated with historical storms that have occurred in a geographic area that includes a geographic location of the building. The attributes of the storm may include at least one of: a storm meteorological signature, a storm duration, a storm direction, thermal shock, whether a storm is conducive to producing damaging hail, whether a storm is conducive to producing strong winds, key meteorological aspects of a storm, length of time that the storm impacted the roof, a direction from which the storm impacts the building, a roof temperature prior to the storm, a roof temperature after the storm, or a thermal shock to roofing material.

The processor 313 may execute a hail data receiving module 425*a* to cause the processor 313 to, for example, receive historical hail data from a hail computing device based upon the building data (block 420*j*). The historical hail data may be representative of attributes of historical hail that has impacted a geographic area that includes the geographic location of the building. Attributes of the hail may include at least one of: a physical characteristic of the hail, a size of the hail, a shape of the hail, a density of the hail, a hardness of the hail, a range of hail sizes produced by a storm, or a resistance to flexing of the hail.

The processor 313 may execute the climate region data receiving module 430*a* to cause the processor 313 to, for example, receive climate region data from a climate zone computing device 360 based upon the building data (block 425*j*). The climate zone data may be representative of at least one of: a climate associated with a geographic location of the building; a humidity associated with a geographic location of the building, a temperature associated with a geographic location of the building, a moisture associated with a geographic location of the building, or whether a geographic location of the building is associated with a marine climate.

The processor 313 may execute a specific event predicting module 453*a* to cause the processor 313 to, for example, determine a predicted specific event and a set of characteristics of the predicted specific event based upon the building data, the weather data, the hail data, and the climate region data (block 430*j*). Execution of the specific event predicting module 453*a* may cause the processor 313 to implement a probability function to predict the specific event (block 430*j*). A contribution of a first term of the probability function may be weighted, via a first weighting variable, relative to a second term of the probability function. The first term of the probability function may be based upon the climate data. The second term of the probability function may be based upon the weather data. The first weighting variable may be dynamically determined based upon at least one of: the building data, the weather data, the hail data, or the climate region data. For example, if an associated building is located within a climate zone that does not ever experience hail, the hail data may be associated with a weighting variable value of zero. The determining of the predicted specific event and the set of characteristics of the predicted specific event may be for only a predicted remaining lifespan of the roof or building. The prediction of the predicted specific event and the set of characteristics of the predicted specific event may be transmitted to an insurer, a property inspector, a property repairer, etc.

Figure 4K:
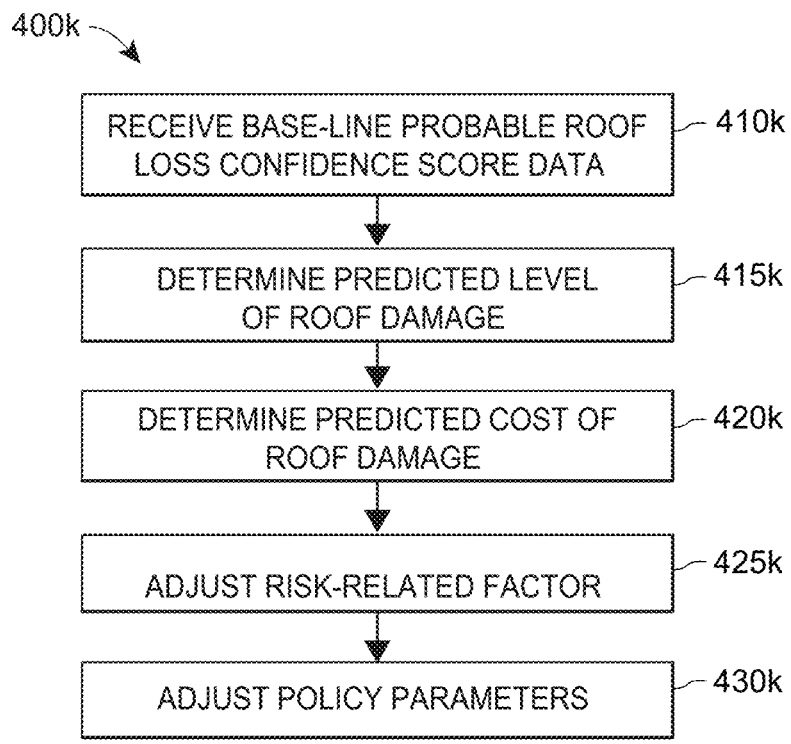
FIG. 4K depicts an example method of adjusting policy parameters based upon probable roof loss confidence score data.

Turning to FIG. 4K, a method 400*k* of adjusting policy parameters may be implemented. Although the method may be shown as being implemented by a processor (e.g., processor 313 of FIG. 3) executing, for example, at least a portion of the modules 410*a*-498*a* of FIG. 4A or the module 312 of FIG. 3, the method may be implemented using other components. The method may be used to more accurately determine a risk-related factor corresponding to a roof of a building and to more accurately determine insurance policy parameters for the roof or the building. For example, the method may be used to more accurately determine the insurance premium an insurance company should charge to insure the roof or the building based upon a more accurate prediction of damage or loss due to specific events. The method of adjusting policy parameters may begin by receiving base-line probable roof loss confidence score data. Then the method may determine a predicted level of roof damage based upon the base-line probable roof loss confidence score data. Then the method may determine predicted cost of roof damage based upon the predicted level of roof damage. Then the method may adjust a risk-related factor based upon the predicted cost of roof damage. Finally, the method may 4*cy* parameters based upon the risk-related factor.

The processor 313 may receive the base-line probable roof loss confidence score data from block 435*b* (block 410*k*). Such base-line probable roof loss confidence score may be retrieved for the building or may be generated as described elsewhere herein.

The processor 313 may execute a level of roof damage predicting module 451*a* to cause the processor 313 to, for example, determine predicted level of roof damage based upon the base-line probable roof loss confidence score data (block 415*k*).

The processor 313 may execute a cost of roof damage predicting module 496*a* to cause the processor 313 to, for example, determine predicted cost of roof damage based upon the determined predicted level of roof damage (block 420*k*). Determining the predicted cost of roof damage may include determining a current undamaged value of the roof based upon its predicted remaining usable lifespan, as determined by the remaining lifespan predicting module 498*a*. Of course, the current undamaged value of the roof may further be based upon the roof type, size, location, and materials. In some embodiments, the cost of repairing or replacing the roof (based upon its location and other attributes, such as size and construction) may be used to determine the predicted cost of roof damage in response to the predicted level of roof damage.

The processor 313 may execute a risk-related factor adjusting module 452*a* to cause the processor 313 to, for example, adjust a risk-related factor based upon the determined predicted cost of roof damage (block 425*k*). The risk-related factor may be a unitless factor that describes the risk associated with insuring the roof or building and may be used to compare the risk associated with insuring different roofs or buildings. One or more such risk-related factors relating to risk associated with an insurance policy covering the roof or building may be adjusted upward or downward based upon the predicted cost of damage to the roof.

The processor 313 may execute a policy parameter adjusting module 497a to cause the processor 313 to, for example, adjust policy parameters based upon the adjusted risk-related factor (block 430k). The policy parameters may be related to an actuarial process for insuring the roof or the building. For example, the adjustment of the policy parameters may include adjusting an insurance premium for insuring the roof or the building or discounts on policy premiums based upon a low the risk-related factor. Adjusting such policy parameters may similarly include adjusting policy limits, coverage types, or terms of the policy. In some embodiments, certain types of coverage may be required, prohibited, or limited based upon the adjusted risk-related factor (e.g., policies may be limited to actual replacement cost under certain circumstances).

Figure 4L:
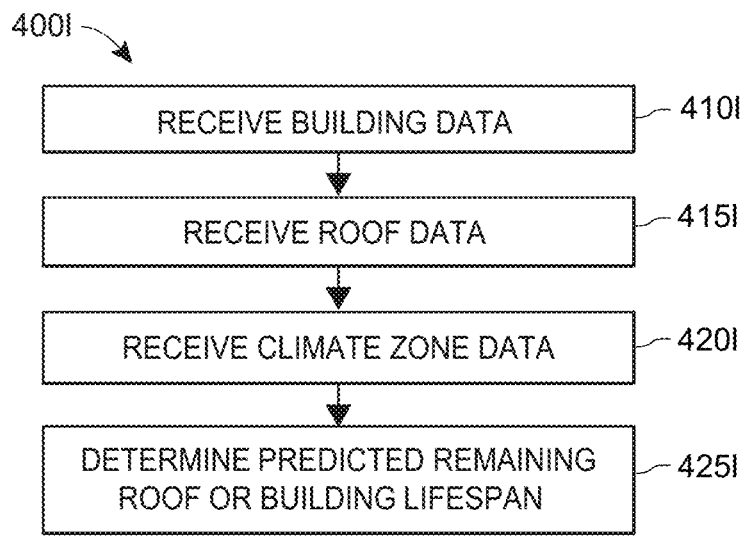
FIG. 4L depicts an example method of determining predicted remaining roof and/or building lifespan.

Turning to FIG. 4L, a method 400l of determining a predicted remaining roof and/or building lifespan may be implemented. Although the method may be implemented by a processor (e.g., processor 313 of FIG. 3) executing, for example, at least a portion of the modules 410a-498a of FIG. 4A or the module 312 of FIG. 3, the method may be implemented using other components. The method may be used to predict when the roof needs replacement or to predict when the building may need to be renovated or replaced. The method may also be used to more accurately determine the condition of the roof and/or the building. The method of determining a predicted remaining roof and/or building lifespan may begin by receiving building data, roof data, and climate zone data. Finally, based on the received data, the method may determine the predicted remaining roof and/or building lifespan.

The processor 313 may execute the building data receiving module 410a to cause the processor 313 to, for example, receive building data from a building computing device 320 (block 410l). The building data may be representative of attributes of the building. Attributes of the building include at least one of: a geographic location of the building, a building orientation relative to geographic cardinal directions, whether the building is single story, whether the building is two story, whether the building is multi-story, whether there is tree cover over the building, location and height of structures surrounding the building, or elevation of terrain surrounding the building.

The processor 313 may execute the roof data receiving module 415a to cause the processor 313 to, for example, receive roof data from a roof computing device 430 based upon the building data (block 415l). The roof data may be representative of a structure forming an upper covering of the building. The roof data may be representative of the roofing system covering the building. Alternatively, or additionally, the roof data may be representative of a structural truss system that forms the design and shape of the roof. Furthermore, the roof data may be representative of the roof sheathing, underlayment, roofing felt, membrane, self-adhered water and ice-dam protection membrane, tar, tar paper, exterior roofing material covering, roof vents, flashing and drip edges, and any other component comprising part of the overall roof surface covering of the building. The roof data may be representative of at least one of: a roofing product age, roof area, a roofing material type, a roofing design, a roofing configuration, a roofing product condition, whether a roof is a gable roof, whether a roof is a hip roof, a roof slope, a number of layers of roofing material, a roof deck condition, a roofing manufacturer product testing result, a roofing installation criteria, a roofing product impact testing result, a roofing product wind testing result, a roofing installation, whether a roofing product complies with a particular roof impact test standard or protocol, whether the roofing product is impact resistant rated, a roofing product impact resistance rating, a roofing product wind rating, a roofing shingle specification, whether a roofing product was installed during cold conditions with hand-sealed roofing cement, a roof underlayment, a roofing facer technology, a polyiso roofing insulation, an EPS insulation, whether a roof includes roof ventilation, an attic detail, a roofing product manufacture warranty, a roofing product installer warranty, or a roofing product third-party warranty.

The processor 313 may execute the climate region data receiving module 430a to cause the processor 313 to, for example, receive climate region data from a climate zone computing device 360 based upon the building data (block 420l). The climate zone data may be representative of at least one of: a climate associated with a geographic location of the building; a humidity associated with a geographic location of the building, a temperature associated with a geographic location of the building, a moisture associated with a geographic location of the building, or whether a geographic location of the building is associated with a marine climate.

The processor 313 may execute a remaining lifespan predicting module 498a to cause the processor 313 to, for example, determine a predicted remaining roof and/or building lifespan of based upon the building data, the roof data, and the climate region data (block 425l). Execution of the remaining lifespan predicting module 498a may cause the processor 313 to implement a probability function to determine the predicted remaining roof and/or building lifespan (block 425l). A contribution of a first term of the probability function may be weighted, via a first weighting variable, relative to a second term of the probability function. The first term of the probability function may be based upon the roof data. The second term of the probability function may be based upon the climate data. The first weighting variable may be dynamically determined based upon at least one of: the building data, the roof data, or the climate region data.

Figure 4M:
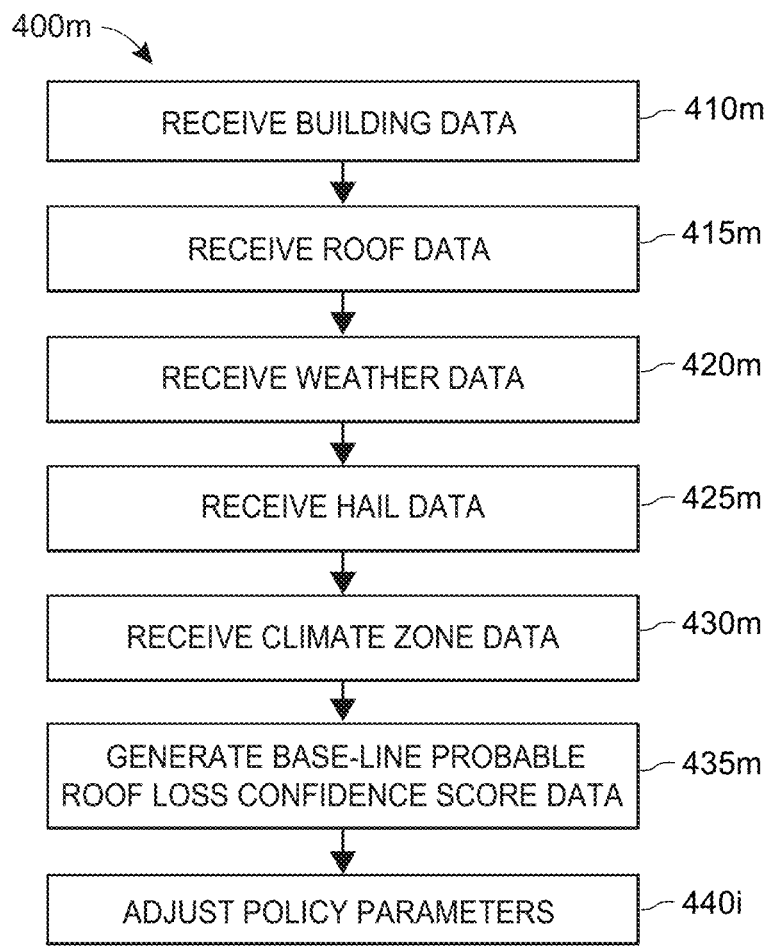
FIG. 4M depicts an example method of adjusting policy parameters.

Turning to FIG. 4M, a method 400m of adjusting policy parameters may be implemented. Although the method may be shown as being implemented by a processor (e.g., processor 313 of FIG. 3) executing, for example, at least a portion of the modules 410a-498a of FIG. 4A or the module 312 of FIG. 3, the method may be implemented using other components. The method 400m may also be used to improve the accuracy of risk assessment based upon a base-line probable roof loss confidence score. The method of determining a predicted level of roof damage to a building may begin with receiving building data, roof data, weather data, hail data, and climate zone data. Then the method may generate the base-line probable roof loss confidence score. Finally, the method may adjust the policy parameters.

In particular, the processor 313 may execute the building data receiving module 410a to cause the processor 313 to, for example, receive building data from a building computing device 320 (block 410m). The building data may be representative of attributes of the building. Attributes of the building include at least one of: a geographic location of the building, a building orientation relative to geographic cardinal directions, whether the building is single story, whether the building is two story, whether the building is multi-story, whether there is tree cover over the building, location and height of structures surrounding the building, or elevation of terrain surrounding the building.

The processor 313 may execute the roof data receiving module 415*a* to cause the processor 313 to, for example, receive roof data from a roof computing device 430 based upon the building data (block 415*m*). The roof data may be representative of a structure forming an upper covering of the building. The roof data may be representative of the roofing system covering the building. Alternatively, or additionally, the roof data may be representative of a structural truss system that forms the design and shape of the roof. Furthermore, the roof data may be representative of the roof sheathing, underlayment, roofing felt, membrane, self-adhered water and ice-dam protection membrane, tar, tar paper, exterior roofing material covering, roof vents, flashing and drip edges, and any other component comprising part of the overall roof surface covering of the building. The roof data may be representative of at least one of: a roofing product age, roof area, a roofing material type, a roofing design, a roofing configuration, a roofing product condition, whether a roof is a gable roof, whether a roof is a hip roof, a roof slope, a number of layers of roofing material, a roof deck condition, a roofing manufacturer product testing result, a roofing installation criteria, a roofing product impact testing result, a roofing product wind testing result, a roofing installation, whether a roofing product complies with a particular roof impact test standard or protocol, whether the roofing product is impact resistant rated, a roofing product impact resistance rating, a roofing product wind rating, a roofing shingle specification, whether a roofing product was installed during cold conditions with hand-sealed roofing cement, a roof underlayment, a roofing facer technology, a polyiso roofing insulation, an EPS insulation, whether a roof includes roof ventilation, an attic detail, a roofing product manufacture warranty, a roofing product installer warranty, or a roofing product third-party warranty.

The processor 313 may execute the weather data receiving module 420*a* to cause the processor 313 to, for example, receive historical weather data from a weather computing device 340 based upon the building data (block 420*m*). The historical weather data may be representative of storm attributes associated with historical storms that have occurred in a geographic area that includes a geographic location of the building. The attributes of the storm may include at least one of: a storm meteorological signature, a storm duration, a storm direction, thermal shock, whether a storm is conducive to producing damaging hail, whether a storm is conducive to producing strong winds, key meteorological aspects of a storm, length of time that the storm impacted the roof, a direction from which the storm impacts the building, a roof temperature prior to the storm, a roof temperature after the storm, or a thermal shock to roofing material.

The processor 313 may execute a hail data receiving module 425*a* to cause the processor 313 to, for example, receive historical hail data from a hail computing device based upon the building data (block 425*m*). The historical hail data may be representative of attributes of historical hail that has impacted a geographic area that includes the geographic location of the building. Attributes of the hail may include at least one of: a physical characteristic of the hail, a size of the hail, a shape of the hail, a density of the hail, a hardness of the hail, a range of hail sizes produced by a storm, or a resistance to flexing of the hail.

The processor 313 may execute the climate region data receiving module 430*a* to cause the processor 313 to, for example, receive climate region data from a climate zone computing device 360 based upon the building data (block 430*m*). The climate zone data may be representative of at least one of: a climate associated with a geographic location of the building; a humidity associated with a geographic location of the building, a temperature associated with a geographic location of the building, a moisture associated with a geographic location of the building, or whether a geographic location of the building is associated with a marine climate.

The processor 313 may execute the base-line probable roof loss confidence score data generation module 435*a* to cause the processor 313 to, for example, generate base-line probable roof loss confidence score data based upon the building data, the roof data, the weather data, the hail data, and the climate region data (block 435*m*). Execution of the base-line probable roof loss confidence score data generation module 435*a* may cause the processor 313 to implement a probability function to generate the base-line probable roof loss confidence score data (block 435*m*). A contribution of a first term of the probability function may be weighted, via a first weighting variable, relative to a second term of the probability function. The first term of the probability function may be based upon the roof data. The second term of the probability function may be based upon the hail data. The first weighting variable may be dynamically determined based upon at least one of: the building data, the roof data, the weather data, the hail data, or the climate region data. For example, if an associated building is located within a climate zone that does not experience hail, the hail data may be associated with a weighting variable value of zero.

The processor 313 may execute a policy parameter adjusting module 497*a* to cause the processor 313 to, for example, adjust policy parameters based upon the adjusted risk-related factor (block 440*m*). The policy parameters may be related to an actuarial process for insuring the roof or the building. For example, the adjustment of the policy parameters may include adjusting an insurance premium for insuring the roof or the building or discounts on policy premiums based upon a low the risk-related factor. Adjusting such policy parameters may similarly include adjusting policy limits, coverage types, or terms of the policy. In some embodiments, certain types of coverage may be required, prohibited, or limited based upon the adjusted risk-related factor (e.g., policies may be limited to actual replacement cost under certain circumstances).

Figure 5A:
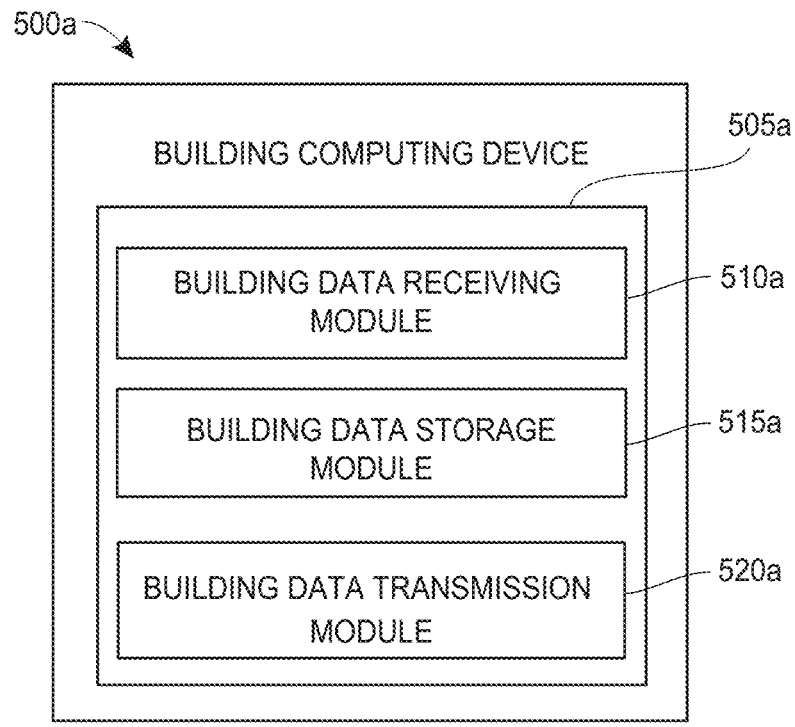
FIG. 5A depicts an example building computing device.

With reference to FIG. 5A, a building computing device 500*a* may include a building data receiving module 510*a*, a building data storage module 515*a*, and a building data transmission module 520*a* stored on, for example, a memory 505*a* as a set of computer-readable instructions. The building computing device 500*a* may be similar to, for example, the building computing device 320 of FIG. 3.

Figure 5B:
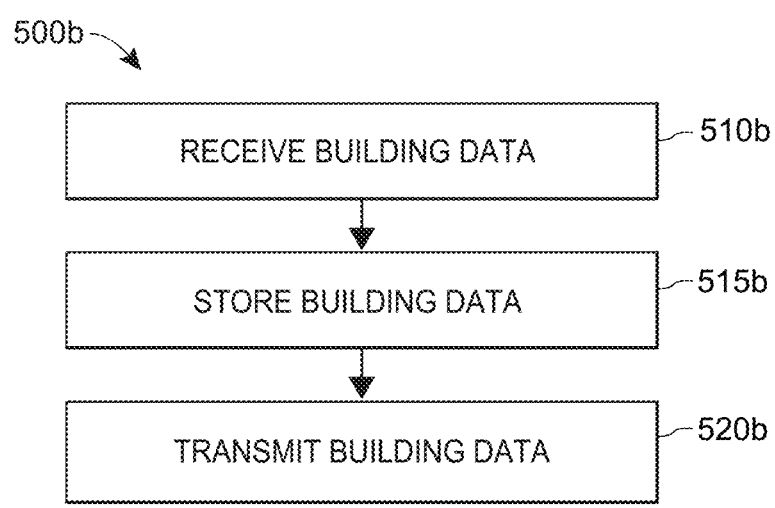
FIG. 5B depicts an example method of implementing a building computing device.

Turning to FIG. 5B, a method 500*b* of implementing a building computing device may be implemented by a processor (e.g., processor 323 of FIG. 3) executing, for example, at least a portion of the modules 510*a*-520*a* of FIG. 5A or the module 323 of FIG. 3. In particular, the processor 313 may execute the building data receiving module 510*a* to cause the processor 323 to, for example, receive building data from a building data source (block 510*b*). The building data source may be, for example, an insurance company policy master record, an insurance claim record, a real property vendor (e.g., an aerial image source, a real estate master listing source, etc.), an insurance claim file, a homeowner, crowd sourcing, or other vendor (e.g., an inspection vendor, a property inspection vendor, etc.).

At least one building data source may incorporate, for example, various internet of things (IoT) or "smart home" technology (e.g., data from video doorbells, data from security cameras, etc.). The building data may include video data, photograph data, and/or audio data. The building data may include historical data for various purposes such as establishing a base-line for a particular property, or portion of a property (e.g., a roof, a building exterior, gutters, down spouts, exterior siding, exterior windows, etc.). Additionally, or alternatively, the building data may include real-time data collected at a time of an "event" (e.g., at a time of a hail storm, at a time of a wind storm, etc.).

The processor 323 may execute the building data storage module 515a to cause the processor 323 to, for example, analyze the building data, using any one of, or a collection of one or more of: a variety of automated techniques including machine learning, artificial intelligence or similar to derive insights to enhance the accuracy of an associated probable roof loss confidence score. For example, a video doorbell or exterior security camera may detect an occurrence of hail proximate a respective building. The processor 323 may execute the building data receiving module 510a to cause the processor 323 to, for example, receive image data from a camera. The processor 323 may execute the building data storage module 515a to cause the processor 323 to, for example, estimate at least one characteristic, including but not limited to: direction of hail, size of hail, density/hardness, elevations of the structure exposed to hail, or duration of hail at the property location, based upon the image data.

Likewise, audio data from similar devices, may be used for automated analysis to provide similar insights as described above. The processor 323 may execute the building data receiving module 510a to cause the processor 323 to, for example, receive audio data from at least one security microphone. The processor 323 may execute the building data storage module 515a to cause the processor 323 to, for example, detect an audio "signature" of hail that is impacting an associated building based upon the audio data. The processor 323 may execute the building data transmission module 520a to cause the processor 323 to, for example, trigger event notifications to the property owner or other party that the property owner designates (e.g., an insurer, a property inspector, a property repairer, etc.) based upon the audio data. The processor 323 may execute the building data storage module 515a to cause the processor 323 to, for example, estimate at least one characteristic, including: a direction of hail, size of hail, hardness, elevations of the structure exposed to hail, and/or duration of hail at the property location, based upon the audio data.

The processor 323 may execute the building data storage module 515a to cause the processor 323 to, for example, store the building data (block 515b). The processor 323 may execute the building data transmission module 520a to cause the processor 323 to, for example, transmit the building data to a confidence score computing device 400a (block 520b).

Figure 6A:
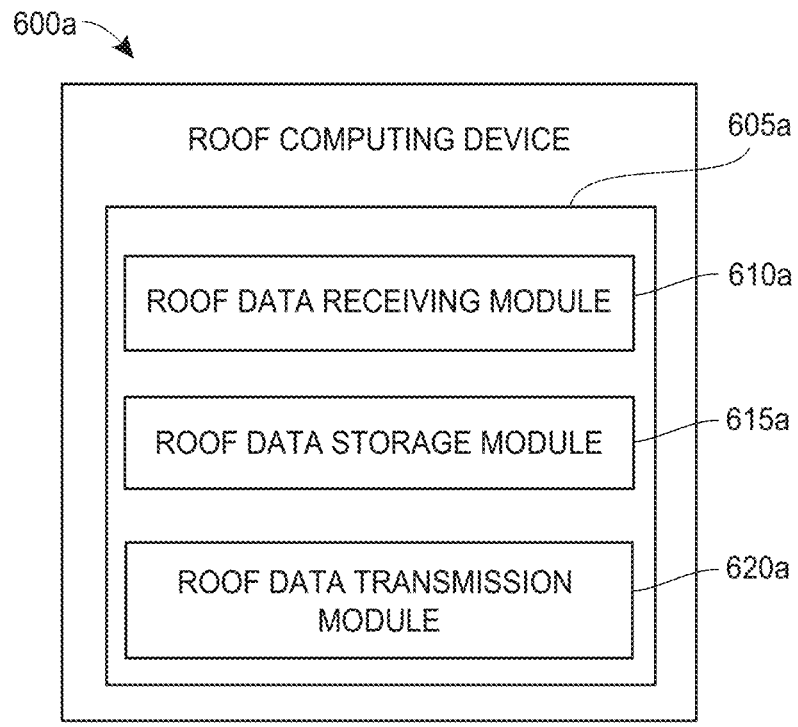
FIG. 6A depicts an example roof computing device.

With reference to FIG. 6A, a roof computing device 600a may include a roof data receiving module 610a, a roof data storage module 615a, and a roof data transmission module 620a stored on, for example, a memory 605a as a set of computer-readable instructions. The roof computing device 600a may be similar to, for example, the roof computing device 330 of FIG. 3.

Figure 6B:
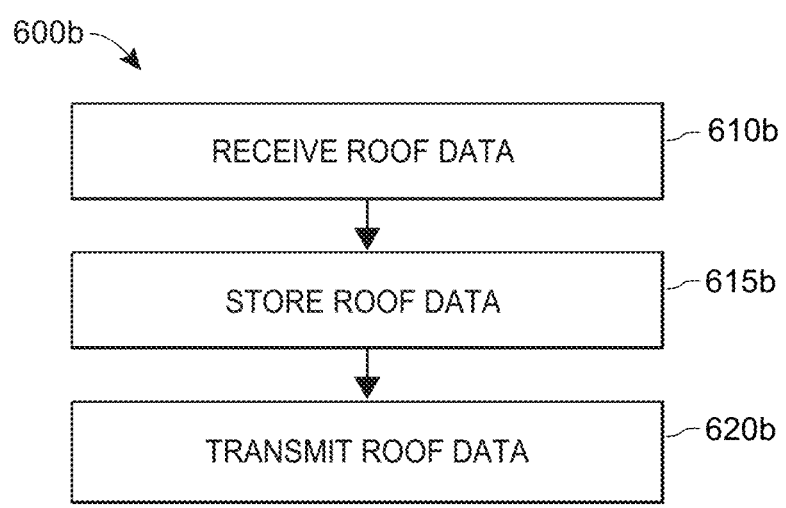
FIG. 6B depicts an example method of implementing a roof computing device.

Turning to FIG. 6B, a method 600b of implementing a roof computing device may be implemented by a processor (e.g., processor 333 of FIG. 3) executing, for example, at least a portion of the modules 610a-620a of FIG. 6A or the module 332 of FIG. 3. In particular, the processor 333 may execute the roof data receiving module 610a to cause the processor 323 to, for example, receive roof data from a roof data source (block 610b). The roof data source may be, for example, an insurance company policy master record, an insurance claim record, real property vendor, a roofing material manufacture, a roofing material installer, an insurance claim file, a homeowner, crowd sourcing, or other vendor (e.g., an inspection vendor, a property inspection vendor, etc.).

At least one roof data source may incorporate, for example, various internet of things (IoT) or "smart home" technology (e.g., data from video doorbells, data from security cameras, etc.). The roof data may include video data, photograph data, and/or audio data. The roof data may include historical data for various purposes such as establishing a base-line for a particular property, or portion of a property (e.g., a roof, a building exterior, gutters, down spouts, exterior siding, exterior windows, etc.). Additionally, or alternatively, the roof data may include real-time data collected at a time of an "event" (e.g., at a time of a hail storm, at a time of a wind storm, etc.).

The processor 333 may execute the roof data storage module 615a to cause the processor 333 to, for example, analyze the image and/or audio data, using any one of, or a collection of one or more of: a variety of automated techniques including machine learning, artificial intelligence or similar to derive insights to enhance the accuracy of an associated probable roof loss confidence score. For example, a video doorbell or exterior security camera may detect an occurrence of hail proximate a respective building. The processor 333 may execute the roof data receiving module 610a to cause the processor 333 to, for example, receive image data from a camera. The processor 333 may execute the roof data storage module 615a to cause the processor 333 to, for example, estimate at least one characteristic, including but not limited to: direction of hail, size of hail, density/hardness, elevations of the structure exposed to hail, or duration of hail at the property location, based upon the image data.

Likewise, audio data from similar devices, may be used for automated analysis to provide similar insights as described above. The processor 333 may execute the roof data receiving module 610a to cause the processor 333 to, for example, receive audio data from at least one security microphone. The processor 333 may execute the roof data storage module 615a to cause the processor 333 to, for example, detect an audio "signature" of hail that is impacting an associated building, based upon the audio data. The processor 333 may execute the roof data transmission module 620a to cause the processor 333 to, for example, trigger event notifications to the property owner or other party that the property owner designates (e.g., an insurer, a property inspector, a property repairer, etc.) based upon the audio data. The processor 333 may execute the roof data storage module 615a to cause the processor 333 to, for example, estimate at least one characteristic, including: a direction of hail, size of hail, hardness, elevations of the structure exposed to hail, and/or duration of hail at the property location, based upon the audio data.

The processor 333 may execute the roof data storage module 615a to cause the processor 333 to, for example, store the roof data (block 615b). The processor 333 may execute the roof data transmission module 620a to cause the processor 333 to, for example, transmit the roof data to a confidence score computing device 400a (block 620b).

Figure 7A:
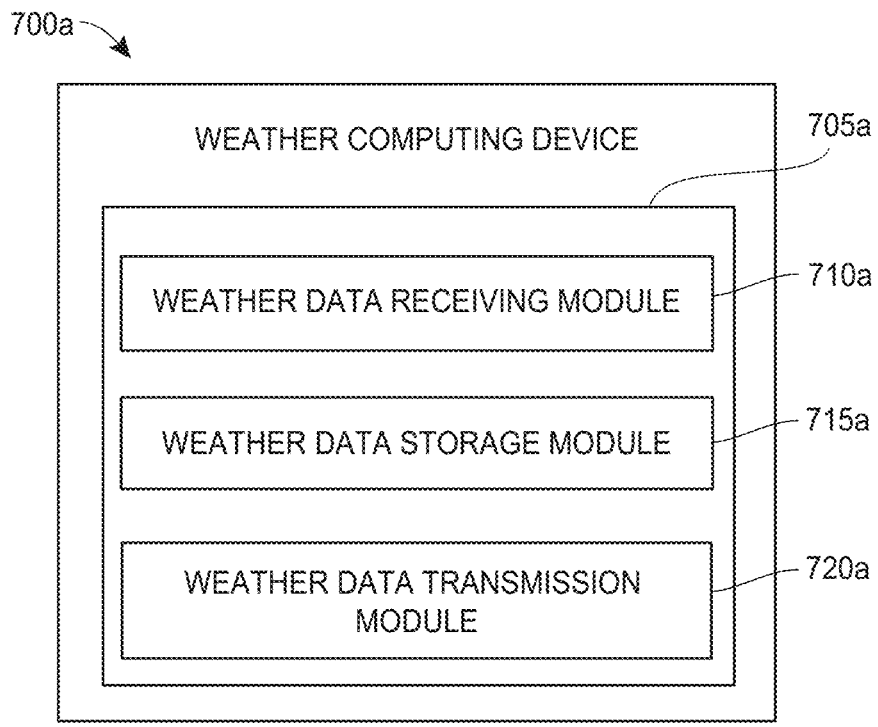
FIG. 7A depicts an example weather computing device.

With reference to FIG. 7A, a weather computing device 700a may include a weather data receiving module 710a, a weather data storage module 715*a*, and a weather data transmission module 620*a* stored on, for example, a memory 705*a* as a set of computer-readable instructions. The weather computing device 700*a* may be similar to, for example, the weather computing device 340 of FIG. 3.

Figure 7B:
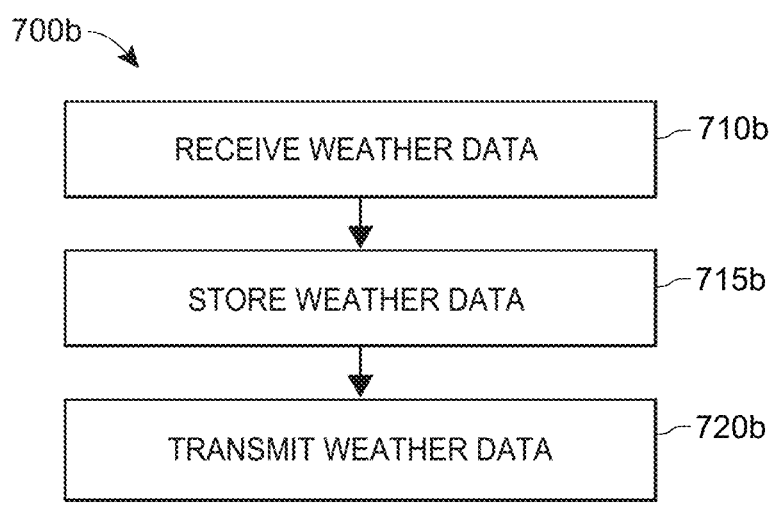
FIG. 7B depicts an example method of implementing a weather computing device.

Turning to FIG. 7B, a method 700*b* of implementing a weather computing device may be implemented by a processor (e.g., processor 343 of FIG. 3) executing, for example, at least a portion of the modules 710*a*-720*a* of FIG. 7A or the module 342 of FIG. 3. In particular, the processor 343 may execute the weather data receiving module 710*a* to cause the processor 343 to, for example, receive weather data from a weather data source (block 710*b*). The weather data source may be, for example, an insurance company policy master record, an insurance claim file, a homeowner, crowd sourcing, or the National Oceanic and Atmospheric Administration—U.S.
Department of Commerce.

The processor 343 may execute the weather data storage module 715*a* to cause the processor 343 to, for example, store the weather data (block 715*b*). The processor 343 may execute the weather data transmission module 720*a* to cause the processor 343 to, for example, transmit the weather data to a confidence score computing device 400*a* (block 720*b*).

Figure 8A:
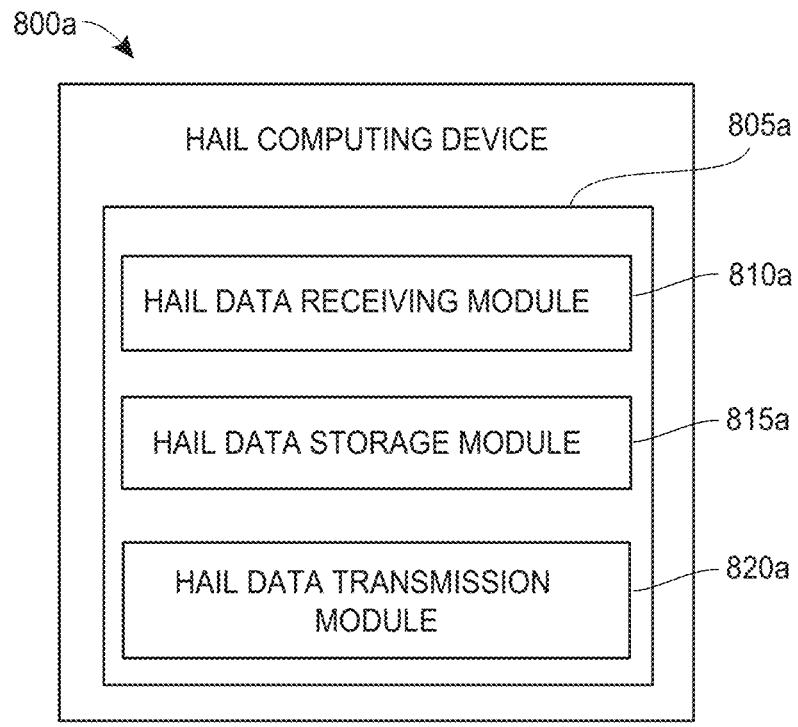
FIG. 8A depicts an example hail computing device.

With reference to FIG. 8A, a hail computing device 800*a* may include a hail data receiving module 810*a*, a hail data storage module 815*a*, and a hail data transmission module 820*a* stored on, for example, a memory 805*a* as a set of computer-readable instructions. The hail computing device 800*a* may be similar to, for example, the hail computing device 350 of FIG. 3.

Figure 8B:
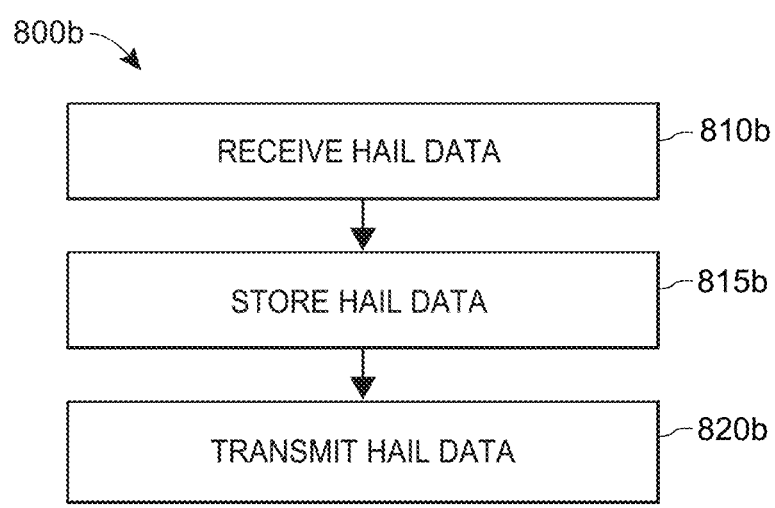
FIG. 8B depicts an example hail of implementing a building computing device.

Turning to FIG. 8B, a method 800*b* of implementing a hail computing device may be implemented by a processor (e.g., processor 353 of FIG. 3) executing, for example, at least a portion of the modules 810*a*-820*a* of FIG. 8A or the module 352 of FIG. 3. In particular, the processor 353 may execute the hail data receiving module 810*a* to cause the processor 353 to, for example, receive hail data from a hail data source (block 810*b*). The hail data source may be, for example, an insurance company policy master record, an insurance claim file, a homeowner, crowd sourcing, or the National Oceanic and Atmospheric Administration—U.S. Department of Commerce.

At least one hail data source may incorporate, for example, various internet of things (IoT) or "smart home" technology (e.g., data from video doorbells, data from security cameras, etc.). The hail data may include video data, photograph data, image data, and/or audio data. The hail data may include historical data for various purposes such as establishing a base-line for a particular property, or portion of a property (e.g., a roof, a building exterior, gutters, down spouts, exterior siding, exterior windows, etc.). Additionally, or alternatively, the hail data may include real-time data collected at a time of an "event" (e.g., at a time of a hail storm, at a time of a wind storm, etc.).

The processor 353 may execute the hail data storage module 815*a* to cause the processor 353 to, for example, analyze image data and/or audio data, using any one of, or a collection of one or more of: a variety of automated techniques including machine learning, artificial intelligence or similar to derive insights to enhance the accuracy of an associated probable roof loss confidence score. For example, a video doorbell or exterior security camera may detect an occurrence of hail proximate a respective building. The processor 353 may execute the hail data receiving module 810*a* to cause the processor 353 to, for example, receive image data from a camera. The processor 353 may execute the hail data storage module 815*a* to cause the processor 353 to, for example, estimate at least one characteristic, including but not limited to: direction of hail, size of hail, density/hardness, elevations of the structure exposed to hail, or duration of hail at the property location, based upon the image data.

Likewise, audio data from similar devices, may be used for automated analysis to provide similar insights as described above. The processor 353 may execute the hail data receiving module 810*a* to cause the processor 353 to, for example, receive audio data from at least one security microphone. The processor 353 may execute the hail data storage module 815*a* to cause the processor 353 to, for example, detect an audio "signature" of hail that is impacting an associated building, based upon the audio data. The processor 353 may execute the hail data transmission module 820*a* to cause the processor 353 to, for example, trigger event notifications to the property owner or other party that the property owner designates (e.g., an insurer, a property inspector, a property repairer, etc.) based upon the audio data. The processor 353 may execute the hail data storage module 815*a* to cause the processor 353 to, for example, estimate at least one characteristic, including: a direction of hail, size of hail, hardness, elevations of the structure exposed to hail, and/or duration of hail at the property location, based upon the audio data.

The processor 353 may execute the hail data storage module 815*a* to cause the processor 353 to, for example, store the hail data (block 815*b*). The processor 353 may execute the hail data transmission module 820*a* to cause the processor 353 to, for example, transmit the hail data to a confidence score computing device 400*a* (block 820*b*).

Figure 9A:
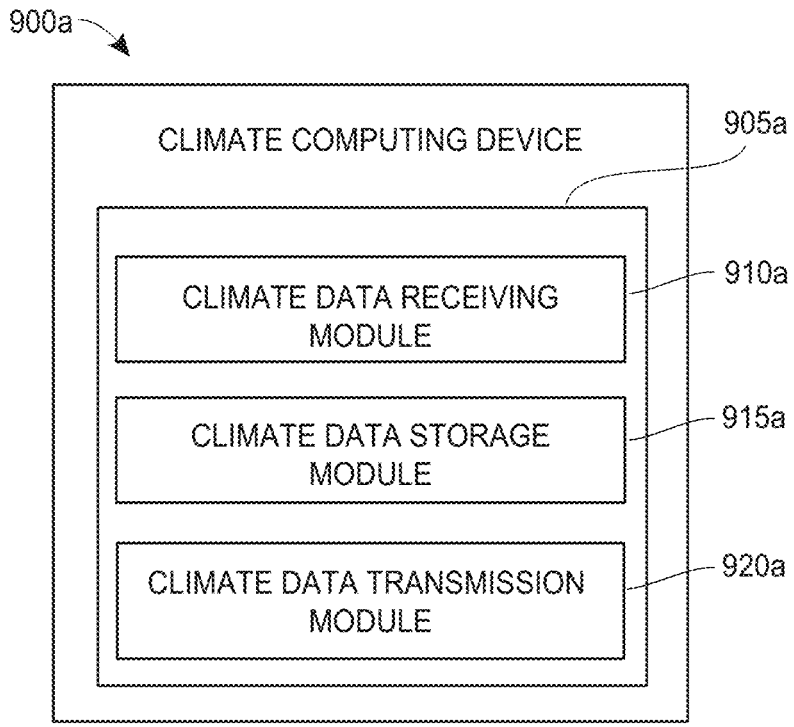
FIG. 9A depicts an example climate zone computing device.

With reference to FIG. 9A, a climate zone computing device 900*a* may include a climate zone data receiving module 910*a*, a climate zone data storage module 915*a*, and a climate zone data transmission module 920*a* stored on, for example, a memory 905*a* as a set of computer-readable instructions. The climate zone computing device 900*a* may be similar to, for example, the climate zone computing device 360 of FIG. 3.

Figure 9B:
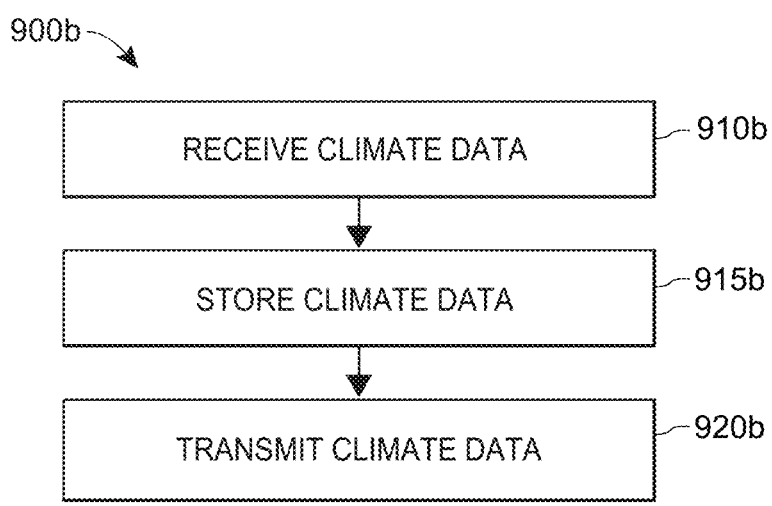
FIG. 9B depicts an example method of implementing a climate zone computing device.

Turning to FIG. 9B, a method 900*b* of implementing a climate zone computing device may be implemented by a processor (e.g., processor 363 of FIG. 3) executing, for example, at least a portion of the modules 910*a*-920*a* of FIG. 9A or the module 362 of FIG. 3. In particular, the processor 363 may execute the climate zone data receiving module 910*a* to cause the processor 363 to, for example, receive climate zone data from a climate zone data source (block 910*b*). The climate zone data source may be, for example, an insurance company policy master record, an insurance claim file, a homeowner, crowd sourcing, or Pacific Northwest National Laboratory—U.S. Department of Energy's Building America Program.

The processor 363 may execute the climate zone data storage module 915*a* to cause the processor 363 to, for example, store the climate zone data (block 915*b*). The processor 363 may execute the climate zone data transmission module 920*a* to cause the processor 363 to, for example, transmit the climate zone data to a confidence score computing device 400*a* (block 920*b*).

Figure 10A:
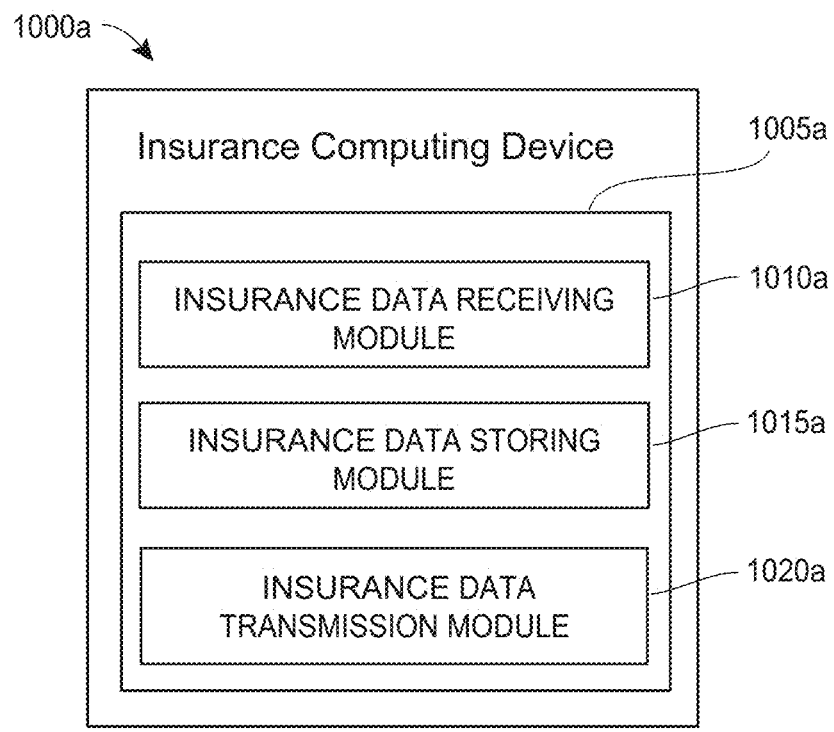
FIG. 10A depicts an example insurance computing device.

With reference to FIG. 10A, an insurance computing device 1000*a* may include an insurance data receiving module 1010*a*, an insurance data storage module 1015*a*, and an insurance data transmission module 1020*a* stored on, for example, a memory 1005*a* as a set of computer-readable instructions. The insurance computing device 1000*a* may be similar to, for example, the insurance computing device 370 of FIG. 3.

Figure 10B:
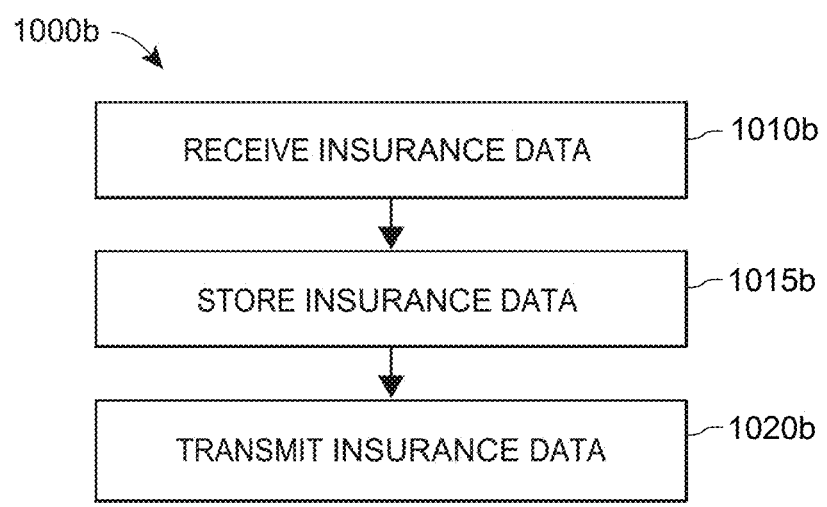
FIG. 10B depicts an example method of implementing an insurance computing device.

Turning to FIG. 10B, a method 1000*b* of implementing an insurance computing device may be implemented by a processor (e.g., processor 373 of FIG. 3) executing, for example, at least a portion of the modules 1010*a*-1020*a* of FIG. 10A or the module 372 of FIG. 3. In particular, the processor 373 may execute the insurance data receiving module 1010*a* to cause the processor 373 to, for example, receive insurance data from an insurance data source (block 1010*b*). The insurance data source may be, for example, an insurance company policy master record, an insurance claim file, a real property vendor (e.g., an aerial image source, a real estate master listing source, etc.), a homeowner, crowd sourcing, or other vendor (e.g., an inspection vendor, a property inspection vendor, etc.).

At least one insurance data source may relate to a building that the insurance company is assessing. The insurance data may incorporate, for example, historical claims records for a region in which the building is located, or for a region with certain similarities (e.g., similar climate, similar household income, similar natural disaster history etc.) to the region in which the building is located. The insurance data may also include cost-related data including records of damage appraisals and/or payments associated with loss events for at least one of the building, other buildings in the region of the building, or other buildings with certain similarities (e.g., age of the building, value of the building, climate in which the building is located, information regarding the roof of the building, etc.) to the building. The insurance data could include other insurance data such as insurance policies, insurance rates, insurance payouts, etc. The insurance data may be written data, video data, photograph data, image data, and/or audio data. The records and/or data discussed above may include historical data for various purposes such as establishing a base-line for a particular property, or portion of a property (e.g., a roof, a building exterior, gutters, down spouts, exterior siding, exterior windows, etc.). Additionally, or alternatively, the insurance data may include real-time data collected at a time of an "event" (e.g., at a time of a hail storm, at a time of a wind storm, etc.).

The processor 353 may execute the insurance data storage module 1015*a* to cause the processor 353 to, for example, analyze the insurance data, using any one of, or a collection of one or more of: a variety of automated techniques including machine learning, artificial intelligence or similar to derive insights to predict cost of roof damage. The predicted cost of roof damage may be a predicted cost of roof damage over a specific amount of time such as the remaining lifetime of the roof, the length of an insurance policy, one year, or some other length of time. The predicted cost of roof damage may be for a predicted specific event (e.g., a hurricane, a tornado, a hail storm, etc.). The insurance data may be analyzed by the processor 353 to, for example, generate a new insurance policy for insuring the building based upon the predicted cost of roof damage, or if the building is already insured, adjust the insurance policy based upon the predicted cost of roof damage.

The processor 353 may execute the insurance data storage module 1015*a* to cause the processor 353 to, for example, store the insurance data (block 1015*b*). The processor 353 may execute the insurance data transmission module 1020*a* to cause the processor 353 to, for example, transmit the insurance data to a confidence score computing device 400*a* (block 1020*b*).

ADDITIONAL CONSIDERATIONS

This detailed description is to be construed as exemplary only and does not describe every possible embodiment, as describing every possible embodiment would be impractical, if not impossible. One may implement numerous alternate embodiments, using either current technology or technology developed after the filing date of this application.

Further to this point, although some embodiments described herein utilize sensitive information (e.g., personal identification information, credit information, income information, etc.), the embodiments described herein are not limited to such examples. Instead, the embodiments described herein may be implemented in any suitable environment in which it is desirable to identify and control specific type of information. For example, the aforementioned embodiments may be implemented by a financial institution to identify and contain bank account statements, brokerage account statements, tax documents, etc. To provide another example, the aforementioned embodiments may be implemented by a lender to not only identify, re-route, and quarantine credit report information, but to apply similar techniques to prevent the dissemination of loan application documents that are preferably delivered to a client for signature in accordance with a more secure means (e.g., via a secure login to a web server) than via email.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software), may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of some of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A computer-implemented method for determining a predicted level of roof damage to a roof of a building, comprising:
    obtaining, by executing a building data receiving module on a processor, building data representative of attributes of the building;
    obtaining, by executing a roof data receiving module on the processor, roof data associated with the building based upon the building data;
    obtaining, by executing a weather data receiving module on the processor, historical weather data associated with the building based upon the building data;
    obtaining, by executing a hail data receiving module on the processor, historical hail data associated with the building based upon the building data, wherein the historical hail data includes at least one of video data, photograph data, or audio data of a hail event and at least one hail characteristic of the hail event provided by a smart home device disposed at the building, wherein the smart home device is configured to:
        monitor audio signals proximate the building;
        detect an occurrence of the hail event by detecting an audio signature within the audio signals, the audio signature including a set of audio characteristics forming a pattern indicative of an occurrence of hail events;
        responsive to detecting the occurrence of the hail event, collect the at least one of the video data, the photograph data, or the audio data of the hail event in real time;
        analyze the at least one of the video data, the photograph data, or the audio data of the hail event to estimate the at least one hail characteristic of the hail event, the at least one hail characteristic including at least one of a direction of the hail event, a size of the hail event, a density of the hail event, elevations of structure exposed to the hail event, or a duration of the hail event; and
        transmit the at least one of the video data, the photograph data, or the audio data of the hail event and the at least one hail characteristic of the hail event to the processor;
    obtaining, by executing a climate region data receiving module on the processor, climate region data associated with the building based upon the building data;
    generating, by executing a base-line probable roof loss confidence score data generation module on the processor, base-line probable roof loss confidence score data based upon the building data, the roof data, the historical weather data, the historical hail data, and the climate region data;
    determining, by executing a current roof condition determining module on the processor, a current roof condition of the roof of the building based upon at least one of the building or roof data; and
    determining, by executing a level of roof damage predicting module on the processor, the predicted level of roof damage to the roof of the building in a future interval based upon the base-line probable roof loss confidence score and the current roof condition, including determining the predicted levels of roof damage to the roof of the building for each of one or more predicted future specific environmental events associated with corresponding predicted sets of characteristics of the predicted future specific environmental events.

2. The computer-implemented method of claim 1, wherein the current roof condition includes a remaining roof lifespan.

3. The computer-implemented method of claim 1, wherein determining the predicted level of roof damage comprises determining a predicted cost of roof damage to the roof of the building, and determining the predicted cost of roof damage is further based upon the attributes of the building.

4. The computer-implemented method of claim 1, further comprising adjusting a risk-related factor associated with an insurance policy relating to the roof based upon the predicted level of roof damage to the roof of the building.

5. The computer-implemented method of claim 1, wherein determining the predicted level of roof damage comprises implementing a probability function to determine the predicted level of roof damage to the roof of the building, wherein a contribution of a first term of the probability function is weighted via a first weighting variable relative to a second term of the probability function.

6. The computer-implemented method of claim 5, wherein the first and second terms of the probability function are each based upon at least one of the building data, the roof data, the weather data, the hail data, or the climate region data.

7. The computer-implemented method of claim 1, further comprising adjusting, by the processor, one or more parameters of an insurance policy for insuring the roof or the building based upon the predicted level of roof damage.

8. The computer-implemented method of claim 1, wherein the attributes of the building include at least one of: a geographic location of the building, a building orientation relative to geographic cardinal directions, height of the building, number of stories of the building, tree cover over or around the building, location and height of structures surrounding the building, or elevation of terrain surrounding the building.

9. The computer-implemented method of claim 1, wherein the hail data is representative of attributes of historical hail that has impacted a geographic area that includes a geographic location of the building, and wherein the attributes of the hail include at least one of: a physical characteristic of the hail, a size of the hail, a shape of the hail, a density of the hail, a hardness of the hail, a range of hail sizes produced by a storm, or a resistance to flexing of the hail.

10. The computer-implemented method of claim 1, wherein the climate region data is representative of at least one of: a climate associated with a geographic location of the building; a humidity associated with a geographic location of the building, a temperature associated with a geographic location of the building, a moisture associated with a geographic location of the building, or whether a geographic location of the building is associated with a marine climate.

11. A system for determining a predicted level of roof damage to a roof of a building, the system comprising:
  a smart home device disposed at the building configured to:
    monitor audio signals proximate the building;
    detect an occurrence of a hail event by detecting an audio signature within the audio signals, the audio signature including a set of audio characteristics forming a pattern indicative of an occurrence of hail events;
    responsive to detecting the occurrence of the hail event, collect at least one of video data, photograph data, or audio data of the hail event in real time;
    analyze the at least one of the video data, the photograph data, or the audio data of the hail event to estimate at least one hail characteristic of the hail event, the at least one hail characteristic including at least one of a direction of the hail event, a size of the hail event, a density of the hail event, elevations of structure exposed to the hail event, or a duration of the hail event; and
    transmit the at least one of the video data, the photograph data, or the audio data of the hail event and the at least one hail characteristic of the hail event to a confidence score computing device; and
  the confidence score computing device, including a processor and a memory having stored thereon:
    a building data receiving module that, when executed by the processor of the confidence score computing device, causes the processor of the confidence score computing device to receive building data from a building computing device, wherein the building data is representative of attributes of the building;
    a roof data receiving module that, when executed by the processor of the confidence score computing device, causes the processor of the confidence score computing device to receive roof data from a roof computing device;
    a weather data receiving module that, when executed by the processor of the confidence score computing device, causes the processor of the confidence score computing device to receive historical weather data from a weather computing device based on the building data;
    a hail data receiving module that, when executed by the processor of the confidence score computing device, causes the processor of the confidence score computing device to receive historical hail data from a hail computing device based on the building data, wherein the historical hail data includes the at least one of the video data, the photograph data, or the audio data of the hail event and the at least one hail characteristic of the hail event provided by the smart home device;
    a climate zone data receiving module that, when executed by the processor of the confidence score computing device, causes the processor of the confidence score computing device to receive climate zone data from a climate zone computing device based on the building data;
    a base-line probable roof loss confidence score data generation module that, when executed by the processor of the confidence score computing device, causes the processor of the confidence score computing device to generate base-line probable roof loss confidence score data for the building based on the building data, the roof data, the historical weather data, the historical hail data, and the climate zone data;
    a current roof condition determining module that, when executed by the processor of the confidence score computing device, causes the processor of the confidence score computing device to determine current roof condition data for the roof of the building based on at least one of the building or roof data; and
    a level of roof damage predicting module that, when executed by the processor of the confidence score computing device, causes the processor of the confidence score computing device to determine the predicted level of roof damage to the roof of the building in a future interval based upon the base-line probable roof loss confidence score and the current roof condition, including determining the predicted levels of roof damage to the roof of the building for each of one or more predicted future specific environmental events associated with corresponding predicted sets of characteristics of the predicted future specific environmental events.

12. The system of claim 11, further comprising a cost of roof damage predicting module stored on the memory of the confidence score computing device that, when executed by the processor of the confidence score computing device, causes the processor of the confidence score computing device to determine the predicted cost of roof damage to the roof of the building based upon the predicted level of roof damage to the roof of the building.

13. The system of claim 11, further comprising a policy parameter adjusting module stored on the memory of the confidence score computing device that, when executed by the processor of the confidence score computing device, causes the processor of the confidence score computing device to adjust policy parameters of an insurance policy associated with the roof of the building based upon the predicted level of roof damage.

14. The system of claim 11, wherein the level of roof damage predicting module implements a probability function to determine the predicted level of roof damage to the roof of the building, wherein a contribution of a first term of the probability function is weighted via a first weighting variable relative to a second term of the probability function.

15. A non-transitory computer-readable medium storing computer-readable instructions that, when executed by a processor, cause the processor to determine a predicted level of roof damage to a roof of a building by implementing:
  a building data receiving module that causes the processor to receive building data that is representative of attributes of the building;
  a roof data receiving module that causes the processor to receive roof data associated with the building based upon the building data;
  a weather data receiving module that causes the processor to receive historical weather data associated with the building based on the building data;
  a hail data receiving module that causes the processor to receive historical hail data associated with the building based on the building data, wherein the historical hail data includes at least one of video data, photograph data, or audio data of a hail event and at least one hail characteristic of the hail event provided by a smart home device disposed at the building, wherein the smart home device is configured to:

monitor audio signals proximate the building;

detect an occurrence of the hail event by detecting an audio signature within the audio signals, the audio signature including a set of audio characteristics forming a pattern indicative of an occurrence of hail events;

responsive to detecting the occurrence of the hail event, collect the at least one of the video data, the photograph data, or the audio data of the hail event in real time;

analyze the at least one of the video data, the photograph data, or the audio data of the hail event to estimate the at least one hail characteristic of the hail event, the at least one hail characteristic including at least one of a direction of the hail event, a size of the hail event, a density of the hail event, elevations of structure exposed to the hail event, or a duration of the hail event; and transmit the at least one of the video data, the photograph data, or the audio data of the hail event and the at least one hail characteristic of the hail event to the processor;

a base-line probable roof loss confidence score data generation module that causes the processor to generate base-line probable roof loss confidence score data associated with the building based on the building data, the roof data, the historical weather data, and the historical hail data;

a current roof condition determining module that causes the processor to determine current roof condition data associated with the roof of the building based on at least one of the building or roof data; and a level of roof damage predicting module that causes the processor to determine the predicted level of roof damage to the roof of the building in a future interval based upon the base-line probable roof loss confidence score and the current roof condition, including determining the predicted levels of roof damage to the roof of the building for each of one or more predicted future specific environmental events associated with corresponding predicted sets of characteristics of the predicted future specific environmental events.

16. The non-transitory computer-readable medium of claim 15, further comprising instructions that cause the processor to implement:

a cost of roof damage predicting module that causes the processor to determine a predicted cost of roof damage to the roof of the building based upon the predicted level of roof damage to the roof of the building; and a policy parameter adjusting module that causes the processor to adjust policy parameters based on the base-line probable roof loss confidence score data, the current roof condition data, and the predicted level of roof damage.

17. The non-transitory computer-readable medium of claim 15, wherein the level of roof damage predicting module causes the processor to implement a probability function to determine the predicted level of roof damage to the roof of the building, wherein a contribution of a first term of the probability function is weighted via a first weighting variable relative to a second term of the probability function.

18. The computer-implemented method of claim 1, wherein the current roof condition of the roof of the building indicates a current level of damage to the roof based upon a damage and repair history of the roof.

19. The system of claim 11, wherein the current roof condition of the roof of the building indicates a current level of damage to the roof based upon a damage and repair history of the roof.

20. The non-transitory computer-readable medium of claim 15, wherein the current roof condition of the roof of the building indicates a current level of damage to the roof based upon a damage and repair history of the roof.

* * * * *